(12) United States Patent
Meguro et al.

(10) Patent No.: US 7,535,683 B2
(45) Date of Patent: May 19, 2009

(54) MAGNETORESISTIVE HEAD WITH IMPROVED IN-STACK LONGITUDINAL BIASING LAYERS

(75) Inventors: Kenichi Meguro, Kanagawa (JP);
Kouichi Nishioka, Kanagawa (JP);
Masahiko Hatatani, Kanagawa (JP);
Chiseki Haginoya, Tokyo (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 360 days.

(21) Appl. No.: 10/977,324

(22) Filed: Oct. 29, 2004

(65) Prior Publication Data
US 2005/0162786 A1 Jul. 28, 2005

(30) Foreign Application Priority Data
Jan. 23, 2004 (JP) ............................. 2004-016126

(51) Int. Cl.
*G11B 5/39* (2006.01)
*G11B 5/127* (2006.01)
(52) U.S. Cl. ............................. 360/324.12; 360/324.2
(58) Field of Classification Search ................. 360/324, 360/324.1, 324.11, 324.12, 324.2, 327, 327.1
See application file for complete search history.

(56) References Cited

U.S. PATENT DOCUMENTS

| | | | | |
|---|---|---|---|---|
| 5,583,725 A * | 12/1996 | Coffey et al. | ........... | 360/324.11 |
| 6,344,954 B1 * | 2/2002 | Redon et al. | ............. | 360/324.2 |
| 6,381,107 B1 * | 4/2002 | Redon et al. | ............. | 360/324.2 |
| 6,504,689 B1 * | 1/2003 | Gill et al. | ................. | 360/324.2 |
| 6,545,848 B1 * | 4/2003 | Terunuma | .............. | 360/324.12 |
| 6,560,077 B2 * | 5/2003 | Fujiwara et al. | .......... | 360/324.1 |
| 6,600,638 B2 * | 7/2003 | Gill | ........................ | 360/324.11 |
| 6,721,139 B2 * | 4/2004 | Gill | ............................ | 360/321 |
| 6,724,587 B2 * | 4/2004 | Gill | ......................... | 360/324.2 |
| 2001/0012188 A1 * | 8/2001 | Hasegawa et al. | ....... | 360/324.12 |
| 2002/0097537 A1 * | 7/2002 | Shimazawa | .............. | 360/324.2 |
| 2002/0181165 A1 * | 12/2002 | Gill | ............................. | 360/321 |
| 2002/0181166 A1 * | 12/2002 | Gill | ............................. | 360/321 |
| 2002/0186514 A1 * | 12/2002 | Childress et al. | ......... | 360/324.2 |
| 2002/0186515 A1 * | 12/2002 | Gill | ......................... | 360/324.2 |
| 2003/0002230 A1 * | 1/2003 | Dee et al. | .............. | 360/324.12 |

(Continued)

FOREIGN PATENT DOCUMENTS

JP 04-358310 A 12/1992

(Continued)

*Primary Examiner*—Brian E Miller
(74) *Attorney, Agent, or Firm*—Townsend and Townsend and Crew LLP; Rambod Nader

(57) ABSTRACT

A magnetoresistive head and a fabricating method thereof accomplishing high sensitivity and low noise are provided even if track width narrowing makes progress. In one embodiment, a pinned layer includes a laminate which includes at least two magnetic layers and where adjacent magnetic layers are coupled antiferromagnetically to each other, and a mechanism to apply a longitudinal biasing field to a free layer is made to function by laminating a nonmagnetic separate layer/longitudinal biasing layer/antiferromagnetic layer connecting the free layer and opposite a nonmagnetic conductive layer (or nonmagnetic tunneling barrier layer). Controlling a magnetization direction of the longitudinal biasing layer which bears application of a longitudinal biasing field to the pinned layer and free layer is achieved by annealing carried out while applying a magnetic field in a track width direction and applying a magnetic field at room temperature.

10 Claims, 13 Drawing Sheets

U.S. PATENT DOCUMENTS

| | | | |
|---|---|---|---|
| 2003/0042903 A1* | 3/2003 | Hasegawa et al. | 324/252 |
| 2003/0103299 A1* | 6/2003 | Saito | 360/324.12 |
| 2003/0137781 A1* | 7/2003 | Carey et al. | 360/324.2 |
| 2003/0174446 A1* | 9/2003 | Hasegawa | 360/319 |
| 2003/0179514 A1* | 9/2003 | Pinarbasi | 360/324.11 |
| 2003/0206383 A1* | 11/2003 | Meguro et al. | 360/324.12 |
| 2004/0008455 A1* | 1/2004 | Hasegawa et al. | 360/324.12 |
| 2004/0042130 A1* | 3/2004 | Lin et al. | 360/324.12 |
| 2004/0047088 A1* | 3/2004 | Hasegawa | 360/324.12 |
| 2004/0061983 A1* | 4/2004 | Childress et al. | 360/324.2 |
| 2004/0246632 A1* | 12/2004 | Nishioka et al. | 360/324.11 |
| 2005/0105222 A1* | 5/2005 | Sbiaa et al. | 360/324.1 |
| 2005/0174704 A1* | 8/2005 | Lin et al. | 360/324.12 |
| 2006/0067016 A1* | 3/2006 | Childress et al. | 360/324.12 |

FOREIGN PATENT DOCUMENTS

| | | | |
|---|---|---|---|
| JP | 07-057223 A | | 3/1995 |
| JP | 08-007235 A | | 1/1996 |
| JP | 2000-057538 A | | 2/2000 |
| JP | 2000-251224 A | | 9/2000 |
| JP | 2001-250205 | * | 9/2001 |
| JP | 2001-250205 A | | 9/2001 |

* cited by examiner air bearing surface air bearing surface

MAGNETORESISTIVE HEAD WITH IMPROVED IN-STACK LONGITUDINAL BIASING LAYERS

CROSS-REFERENCES TO RELATED APPLICATIONS

This application claims priority from Japanese Patent Application No. JP2004-016126, filed Jan. 23, 2004, the entire disclosure of which is incorporated herein by reference.

BACKGROUND OF THE INVENTION

This invention relates to a magnetic head mounted in a magnetic recording system, more specifically to a magnetoresistive head and a fabricating method thereof to read information recorded on a magnetic recording medium.

Recently, a GMR (Giant Magnetoresistive) head using a so-called "spin valve", which has a basic configuration consisting of magnetic layer/nonmagnetic conductive layer/magnetic layer/antiferromagnetic layer as written in JP-A 358310/1992, has been widely adopted for a magnetoresistive head mounted in a magnetic recording system as a read sensor. In the spin valve, a magnetic film in which the magnetization direction is pinned in one direction by magnetic exchange coupling with an antiferromagnetic film is called a pinned layer. On the other hand, another magnetic layer is called a free layer because the magnetization direction can be changed in response to an external field.

A GMR head using a spin valve transduces a magnetic signal to a voltage change or a current change by using the phenomenon in which the electrical resistivity changes according to the angle of magnetization between the pinned layer and the free layer. Therefore, it is most important that the magnetization direction of the pinned layer be fixed unidirectionally (concretely, the direction perpendicular to the magnetic recording medium) when making the spin valve function as a magnetic sensor. That is, it is necessary that the magnetic field required to reverse the magnetization of the pinned layer (which corresponds to a magnetic exchange coupling field given by the antiferromagnetic layer) be controlled to be sufficiently larger than the signal field from the magnetic recording medium, the leakage field from the write head, and so on. Moreover, considering the annealing process during magnetic head fabrication and the operating environmental temperature of the head, the thermal stability of the magnetic exchange coupling field, which is imparted to the pinned layer from the antiferromagnetic layer, also becomes an important factor.

Currently, a large magnetic exchange coupling field can be obtained, and, because of their excellent thermal stability, alloys designated by Mn-$M_1$ containing about 50 at % Mn (where $M_1$ is a noble metal such as Pt etc.) have come into mainstream use for the antiferromagnetic film. These materials do not impart a magnetic exchange coupling field to the pinned layer on the as-deposited spin valve. This is because a Mn-$M_1$ alloy is a disordered alloy having an FCC structure as-deposited and does not exhibit antiferromagnetism. In the case where a magnetic exchange coupling field is imparted to the pinned layer, it is generally necessary to apply annealing under magnetic field. It is known that a Mn-$M_1$ alloy phase-transforms to an ordered alloy having a Cu—Au I type structure by annealing at a temperature around 230° C.~270° C., and becomes antiferromagnetic. Additionally, while the annealing is carried out in a magnetic field, the pinned layer exchange-couples with the antiferromagnetic layer unidirectionally and can pin the magnetization direction. That is, in the case where a Mn-$M_1$ alloy is used for the antiferromagnetic film to control the magnetization direction of the pinned layer, an annealing step in a magnetic field is necessary to obtain a large magnetic exchange coupling field and an excellent thermal stability.

In general, it is preferable that the upper and lower shields which are placed sandwiching the spin valve in the direction of the film thickness, the free layer being one component of the spin valve, and the magnetic pole at the write head have magnetization directions controlled to be the in direction of the track width which is perpendicular to the magnetization of the pinned layer (the direction perpendicular to the magnetic recording medium). Therefore, there is a concern that annealing in a magnetic field to control the magnetization direction of the pinned layer affects the above-mentioned other magnetic layers, specifically the magnetization direction of the free layer. If the magnetization direction of the free layer is shifted from the desired the track width direction, problems arise such as destroying the symmetrical nature of the response characteristics relative to an external field and not being able to obtain excellent reading characteristics. Therefore, it is necessary to pay close attention to control the magnetization direction between the pinned layer and the free layer to be orthogonal.

Moreover, because a Mn-$M_1$ alloy (where $M_1$ is a noble metal such as Pt, etc.) needs a film thickness of at least about 10~20 nm, one expects there to be a disadvantage in terms of making the distance between the upper and lower shields narrower with increasing recording density.

As another means to pin the magnetization direction of the pinned layer, a configuration of a pinned layer is disclosed in the patent document JP-A 7235/1996, in which a pinned layer configuration not using an antiferromagnetic layer is described consisting of a magnetic layer/antiferromagnetic coupling layer/magnetic layer which is so-called "self-pinned". Moreover, in the patent documents JP-A 57538/2000 and JP-A 251224/2000, a configuration is disclosed in which a hard magnetic material is used as one of the above-mentioned magnetic layers in order to pin the magnetization of the "self-pinned" pinned layer more strongly. In this configuration, the annealing process in field is not necessary to obtain magnetic exchange coupling with the antiferromagnetic layer. Additionally, because there is no antiferromagnetic layer, the total film thickness of the spin valve can be made thinner, with the resultant advantage that the gap between the upper and lower shields can be made narrower. However, there is no detailed description concerning the direction control of the magnetization of the pinned layer and free layer presented above, and there is no guarantee of normal operation after the thermal and magnetic histories during fabrication of a magnetic head.

Moreover, it is necessary to apply a longitudinal biasing field to a GMR head using a spin valve to give a multi-domain structure to the free layer to keep out Barkhausen noise created when a free layer becomes a multi-magnetic domain structure. A longitudinal biasing method is disclosed in the patent document JP-A 57223/1995, in which a hard magnetic material or a laminated layer of a magnetic layer and an antiferromagnetic layer is placed at both sides of the spin valve and a longitudinal biasing field is applied to the free layer to make it a single domain structure. In particular, the former is called a hard-bias structure, and it has become the mainstream of present GMR head structures.

The hard-bias structure is effective in keeping out Barkhausen noise. On the other hand, it is well known that the structure pins the magnetization of the free layer at the edges of the sensor and forms a so-called insensitive area. Because the magnetization direction of the free layer is hard to change in response to a signal field in the insensitive area, formation of the insensitive area substantially lowers reading sensitivity. Especially, this problem is expected to become more conspicuous with progressive narrowing of the track width and increasing occupation ratio of the insensitive area as the longitudinal recording density of magnetic recording systems increase in the future. Moreover, since the magnetization direction of the pinned layer is shifted due to a longitudinal biasing field caused by the hard magnetic material, there is concern that it will decrease reading output and affect the symmetry of the reading waveform.

If the longitudinal biasing field applied to the free layer is reduced by, for instance, thinning the film thickness of the hard magnetic material to solve these problems, the effectiveness of keeping out Barkhausen noise becomes inadequate. This means that keeping out Barkhausen noise and insuring reading sensitivity have a trade-off relationship, and it is difficult to satisfy both at the same time.

Another means to apply a longitudinal biasing field to the free layer is disclosed in the patent document JP-A 250205/2001, in which a laminated bias film consisting of laminated films of a bias nonmagnetic film/bias magnetic film/bias antiferromagnetic film is fabricated connected to the free layer after forming the spin valve consisting of an antiferromagnetic layer/pinned layer/nonmagnetic conductive film/free layer. In this configuration, the magnetization direction of the longitudinal biasing magnetic film is pinned by magnetic exchange coupling with the longitudinal biasing antiferromagnetic film. Moreover, a longitudinal biasing field can substantially be applied to the free layer by coupling the free layer with the longitudinal biasing magnetic layer magnetically or antiferromagnetically through the longitudinal biasing nonmagnetic film. In this case, one expects that there is an advantage that the longitudinal biasing field can be easily adjusted by controlling the film thickness of the longitudinal biasing nonmagnetic film. However, in this configuration, it is very difficult to produce an orthogonal array of the magnetization of the pinned layer and longitudinal biasing magnetic layer. That is, because two annealing steps in a magnetic field are necessary in which magnetization of the pinned layer is pinned in a direction perpendicular to the magnetic recording medium in the first step and magnetization of the longitudinal biasing magnetic film is pinned in the track width direction in the second step, a problem arises in which the magnetization direction of the pinned layer is shifted to the track width direction from a direction perpendicular to the magnetic recording medium after the second annealing step. In order to pin the magnetization of the pinned layer and longitudinal biasing magnetic film in orthogonal directions, it is necessary to trade-off the magnitude of the magnetic exchange coupling applied to either of the aforementioned magnetic films and their thermal stability. In this case, it may be very difficult to obtain reading characteristics with high reliability.

BRIEF SUMMARY OF THE INVENTION

In the future, because of the reasons described above, one expects that reconciling guaranteed reading sensitivity and suppressed Barkhausen noise may become difficult to achieve in a hard-bias structure by progressive narrowing of the track width with increasing longitudinal recording density of magnetic recording systems. That is, in a hard-bias structure, it is virtually impossible to obtain reading characteristics which can be used for future magnetic recording devices with high recording density; therefore it is necessary to establish a new longitudinal biasing method. On the other hand, in an alternate longitudinal biasing method which is currently being proposed, controlling the magnetization direction of the layer applying a longitudinal biasing field to the pinned layer and free layer is difficult, thereby problems may arise such as decreased reading sensitivity and affected symmetry of the reading waveform. It is a common problem not only for next generation magnetoresistive heads such as a current CIP (Current in the plane)-GMR head, but also for a TMR (Tunneling Magnetoresistive) head and a CPP (Current perpendicular to the plane)-GMR head which are expected to be used in practice.

It is a feature of the present invention to provide a method for easily controlling the magnetization direction of a layer applying a longitudinal biasing field to the pinned layer and the free layer in a magnetoresistive head having a longitudinal biasing method in lieu of a hard-bias.

Representative features of the present invention disclosed in the patent application are summarized as follows. A "self-pinned" structure is used which can firmly pin the magnetization direction of the pinned layer without placing an antiferromagnetic film on the pinned layer, an annealing process in a magnetic field perpendicular to the magnetic recording medium is not necessary to control the magnetization direction, and an annealing process in a magnetic field in the track width direction and applying a magnetic field at room temperature are needed.

In further detail, the above-described features can be achieved by improving the following three points; (1) a mechanism to pin the magnetization direction of the pinned layer, (2) a device to apply a longitudinal biasing field to the free layer, (3) an apparatus to control the magnetization direction of the magnetic layer applying a longitudinal biasing field to the pinned layer and the free layer.

(1) As a way of pinning the magnetization direction of the pinned layer, the configuration of the pinned layer includes at least two magnetic layers, which are laminated though an antiferromagnetic coupling layer, and the adjoining magnetic layers form a laminated body coupling antiferromagnetically to each other.

At least one of the magnetic layers constituting the pinned layer may be composed of a hard magnetic material. Additionally, the saturation magnetic flux density and the film thickness of each magnetic layer constituting the pinned layer are controlled to make the substantial magnetic moment almost zero when the magnetization of each magnetic layer constituting the pinned layer is aligned in an antiparallel manner. As a result, the magnetization of the pinned layer does not easily reverse or rotate in response to the external field, and the magnetization direction can be substantially pinned. Forming a pinned layer while applying a magnetic field in a desired direction (that is, a direction perpendicular to the magnetic recording medium) and inducing uniaxial magnetic anisotropy makes it possible to control the magnetization direction of the pinned layer.

Additionally, in a magnetic head fabrication process, there are cases where the magnetization direction of the pinned layer is changed or the direction dispersed on a microscopic scale caused by various thermal and magnetic histories. However, the solution to the problems will be described in detail below (3).

(2) A way of applying a longitudinal biasing field to a free layer works by laminating a nonmagnetic separate layer/longitudinal biasing layer/antiferromagnetic layer on the opposite side of the nonmagnetic conductive layer or non-magnetic tunneling barrier layer connected to the free layer.

It is preferable to induce uniaxial magnetic anisotropy applying a field in track width direction in the case of forming the free layer and the longitudinal biasing layer. The longitudinal biasing layer pins the magnetization direction in the track width direction by magnetic exchange coupling with the antiferromagnetic layer. At the edge of the track width direction of the magnetoresistive sensor, a longitudinal biasing field is applied in the track width direction by return of magnetic flux essentially from the longitudinal biasing layer to the free layer. Additionally, the effect can be enhanced by antiferromagnetically coupling the free layer and longitudinal biasing layer through the nonmagnetic separate layer. Since the magnitude of the longitudinal biasing field can be arbitrarily changed by selecting the magnetic moment of the longitudinal biasing layer and the material and film thickness of the nonmagnetic layer, it is possible to easily reconcile high reading sensitivity and suppressed Barkhausen noise. Moreover, materials and film thicknesses, which have a large magnetic exchange coupling with excellent thermal stability, are preferably adopted for the antiferromagnetic layer.

(3) A magnetization direction controlling method of the pinned layer and the magnetic film applying a longitudinal biasing field to the free layer is described as follows. Magnetization of the longitudinal biasing layer is set to be in the track width direction by annealing while applying a magnetic field in the track width direction after depositing of a magnetoresistive film comprising the pinned layer including a laminated body in which the adjoining magnetic layers are antiferromagnetically coupled to each other, a nonmagnetic conductive layer or nonmagnetic tunneling barrier layer, a free layer, a nonmagnetic separate layer, a longitudinal biasing layer, and an antiferromagnetic layer.

During the annealing process in a magnetic field, there is a possibility that the magnetization of the pinned layer is shifted from a desired direction, but the magnetization direction of the pinned layer can be aligned in the direction perpendicular to the magnetic recording medium by applying a magnetic field at room temperature after completing the annealing process. Even if the magnetization direction of the pinned layer is shifted from the direction perpendicular to the magnetic recording medium, it can be restored to the direction perpendicular to the magnetic recording medium by applying a static field at room temperature. The important thing herein is that it is possible to control the magnetization direction of the pinned layer to be in a desired direction even if a special treatment such as an annealing process in a magnetic field is not applied. That is, a step determining the magnetization direction of the pinned layer does not affect the magnetization direction of the free layer and the longitudinal biasing layer which applies a longitudinal biasing field to the free layer. Therefore, the magnetization directions of the pinned layer and the longitudinal biasing layer which applies a longitudinal biasing field to the free layer can be easily aligned in an orthogonal direction without interfering with each other.

Embodiments of the present invention achieve control of the magnetization direction of the pinned layer and a layer which applies a longitudinal biasing field to the free layer, and provide a magnetoresistive head and a manufacturing method thereof which can accomplish high reading sensitivity, suppression of Barkhausen noise, and excellent symmetry of a reading waveform even if there is progress in narrowing the track width.

DETAILED DESCRIPTION OF THE INVENTION

The specific embodiments of the present invention will be described with reference to the accompanying drawings as follows. For the simplicity of understanding, the same symbols are allocated to the same parts in the following figures.

FIRST EMBODIMENT

Figure 1A:
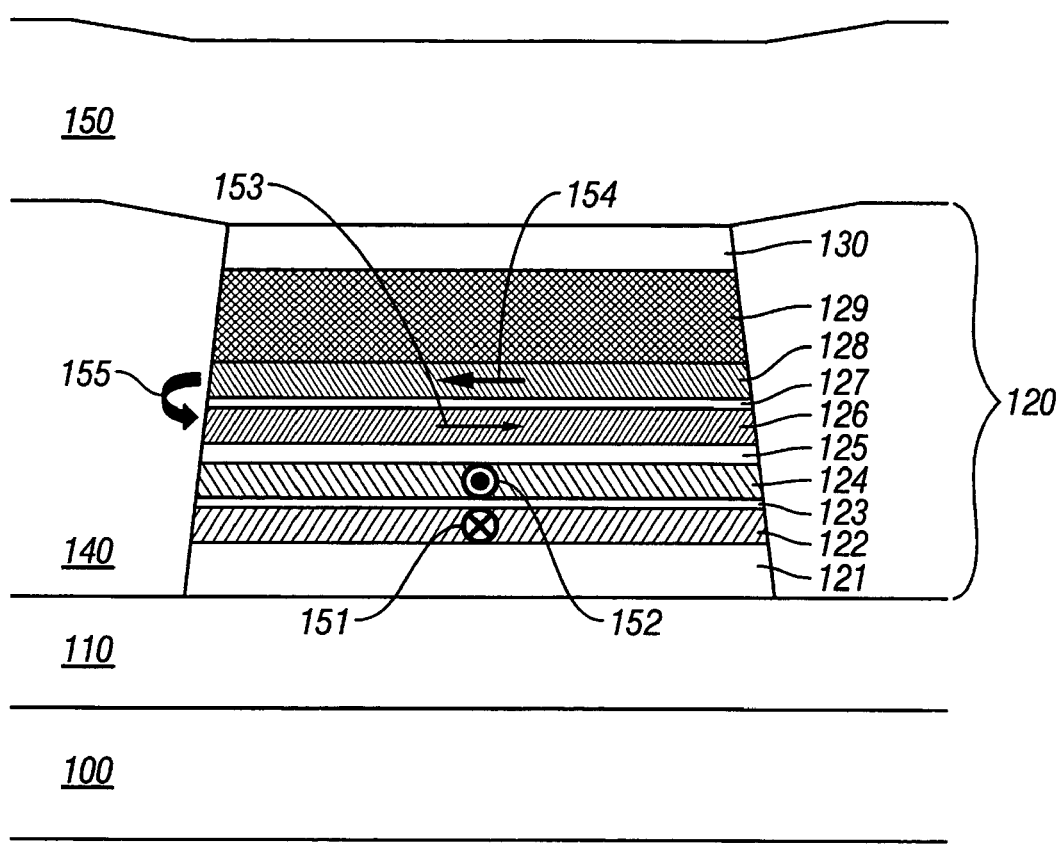
FIG. 1(A) is a schematic diagram illustrating an embodiment of a magnetoresistive head when seen from the air bearing surface.
Figure 1B:
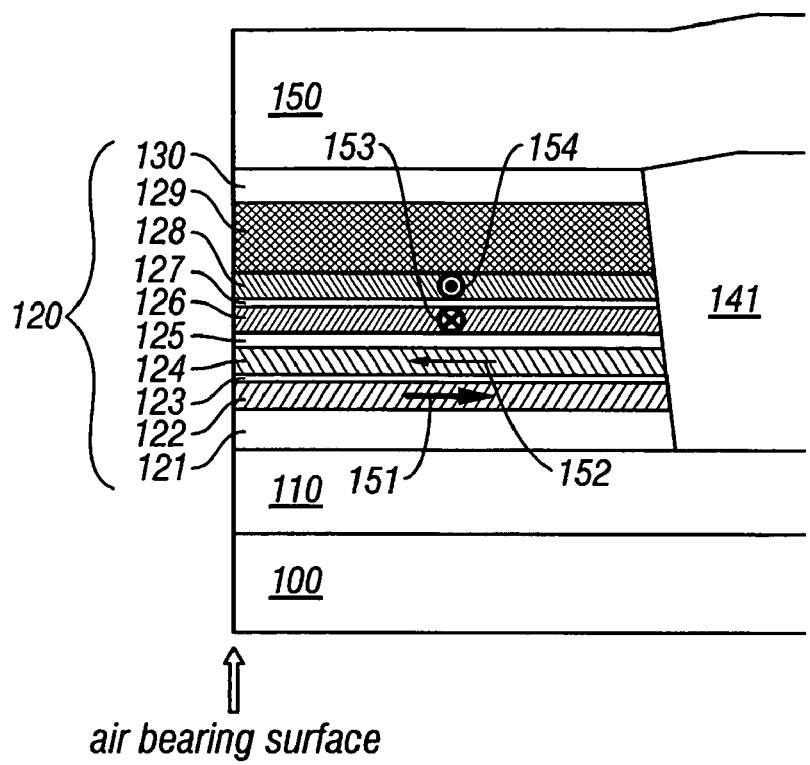
FIG. 1(B) is a cross-section of the magnetic head shown in FIG. 1(A) in the sensor height direction.

FIG. 1 is a schematic diagram illustrating the first embodiment of a magnetoresistive head of the present invention. FIG. 1(A) is a schematic diagram seen from the air bearing surface, and FIG. 1(B) is a cross-section at the track center in the sensor height direction (a direction perpendicular to the magnetic recording medium). The structure together with an outline of the fabricating procedure of a magnetoresistive head will be described below.

A magnetoresistive film 120 is formed on a substrate 100 after forming a lower shield 110, and the track width direction is patterned into a desired shape by photolithography, ion milling, or reactive ion etching. Next, an insulator layer 140 is formed at both sides of the magnetoresistive film 120 using a lift-off method. Similarly, in the sensor height direction, the magnetoresistive film 120 is patterned into a desired shape by photolithography, ion milling, or reactive ion etching, and an insulator layer 141 is formed using a lift-off method. The order of patterning the magnetoresistive film 120 may also be exchanged between the track width direction and sensor height direction.

Then, an upper shield 150 is formed. The lower shield 110 and upper shield 150 are also working as a pair of electrodes supplying current in the film-thickness direction of the magnetoresistive film 120, and they detect the electrical resistivity change of the magnetoresistive film 120. Therefore, it is preferable that interfaces between the lower shield 110 and the magnetoresistive film 120 and between the magnetoresistive film 120 and the upper shield 150 are free of electrical contact resistance. In order to mitigate this effect, just prior to forming the magnetoresistive film 120 and the upper shield 150, surface oxide layers and adherents/absorbents are removed effectively using plasma etching or ion beam etching. Furthermore, the lower shield and the lower electrode can be formed individually as substrate/lower shield/lower gap/lower electrode/magnetoresistive film (similar to the upper shield and upper electrode).

One example of a detailed film configuration of the magnetoresistive film 120 is a primary layer 121/first magnetic layer 122/antiferromagnetic coupling layer 123/second magnetic layer 124/nonmagnetic conductive layer or nonmagnetic tunneling barrier layer 125/magnetic free layer 126/antiferromagnetic separate layer 127/longitudinal biasing layer 128/antiferromagnetic layer 129/protection layer 130. The first magnetic layer 122/antiferromagnetic coupling layer 123/second magnetic layer 124 correspond to the pinned layer and pins the magnetization direction without using the antiferromagnetic layer. On the other hand, the magnetization direction of the magnetic free layer 126 easily rotates in response to an external field. Therefore, the relative angle between the second magnetic layer 124 comprising the pinned layer and the magnetic free layer 126 changes in response to a signal field from the magnetic recording medium; correspondingly, the electrical resistivity of the magnetoresistive film 120 changes and an electromagnetically transformed reading output is obtained.

In the figures, the magnetization direction of each magnetic layer is indicated by symbols such as arrows. An overview of the situation where a longitudinal biasing field is applied to the free layer will be described using this. The first magnetic layer 122 and the second magnetic layer 124 constituting the free layer are antiferromagnetically coupled through the antiferromagnetic coupling layer 123, and the magnetizations are aligned perpendicular to the medium (sensor height direction). Symbols 151 and 152 show the magnetization directions of the first magnetic layer 122 and the second magnetic layer 124, respectively. The magnetization of the longitudinal biasing layer 128 applying a longitudinal biasing field to the free layer 126 is pinned to the track width direction and is exchange-coupling with the antiferromagnetic layer 129 as shown in an arrow 154. Accordingly, since magnetic flux returns at the edge of track between the longitudinal biasing layer 128 and magnetic free layer 126 as shown by an arrow 155, the magnetization directions of the magnetic free layer 126 and longitudinal biasing layer 128 become stable. That is, a bias field is applied substantially to the magnetic free layer 126 in the track width direction, and it creates the effect of making the magnetic free layer 126 a single domain. Additionally, in the case where the magnetic free layer 126 and the longitudinal biasing layer 128 are antiferromagnetically coupled to each other through the nonmagnetic separate layer 127, the effect is further enhanced.

As mentioned above, by controlling the magnetization direction of each magnetic layer a magnetoresistive head can be obtained which realizes high reading sensitivity, suppression of Barkhausen noise, and excellent symmetry of reading waveforms. In the figure, the magnetization direction 154 of the longitudinal biasing layer 128 is shown toward the left when viewed from the air bearing surface, but it may be toward right (in this case, the magnetization direction 153 of the magnetic free layer 126 is aligned toward the left). It is similar for the magnetization directions 151 and 152 of the first magnetic layer 122 and the second magnetic layer 124 constituting the pinned layer.

SECOND EMBODIMENT

Figure 2:
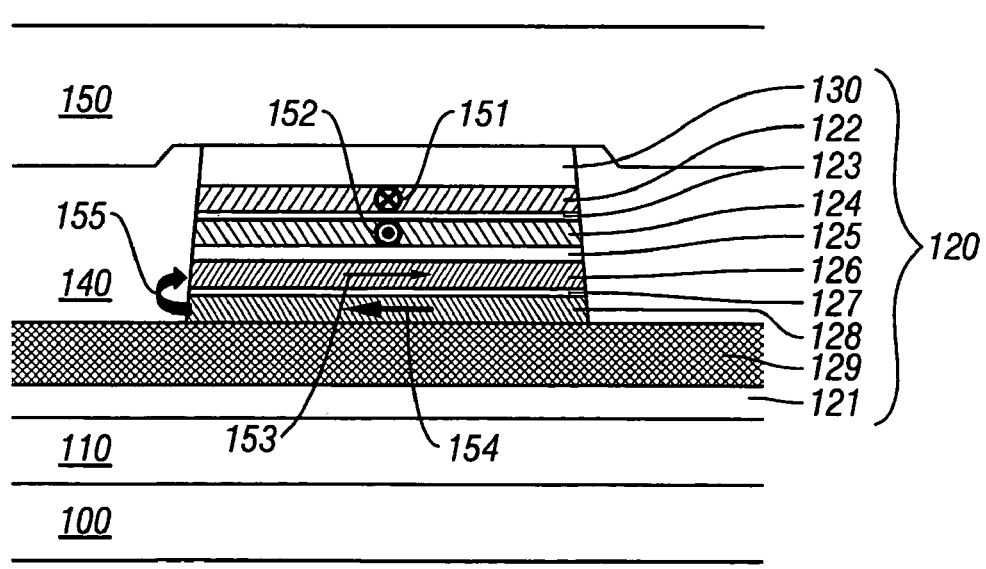
FIG. 2 is a schematic diagram illustrating another embodiment of a magnetoresistive head of the present invention when seen from the air bearing surface.

FIG. 2 is a schematic diagram illustrating the second embodiment of a magnetoresistive head of the present invention when seen from the air bearing surface. The cross-section at the track center in the sensor height direction is omitted because it is the same as the first embodiment.

In the first embodiment, a configuration was shown as an example in which the pinned layer is formed on a side close to the substrate 100 in the magnetoresistive layer 120. On the other hand, in the second embodiment, the order of lamination is reversed as the primary layer 121/antiferromagnetic layer 129/longitudinal biasing layer 128/nonmagnetic layer 127/magnetic free layer 126/nonmagnetic conductive layer or nonmagnetic tunneling barrier layer 125/second magnetic layer 124/antiferromagnetic coupling layer 123/first magnetic layer 122/protection layer 130. Additionally, the primary layer 121/antiferromagnetic layer 129 are not etched in the track width dimension, and they are patterned wider than the part of longitudinal biasing layer 128/nonmagnetic separate layer 127/magnetic free layer 126/nonmagnetic conductive layer or nonmagnetic tunneling barrier layer 125/second magnetic layer 124/antiferromagnetic coupling layer 123/first magnetic layer 122/protection layer 130. When etching the magnetoresistive layer 120, fabrication in the above-described shape is possible by controlling the etching time while monitoring etched particles using a mass spectrometer, etc.

In a CPP-GMR head using a nonmagnetic conductive layer for the layer 125, a parasitic resistance of the primary layer 121/antiferromagnetic layer 129, etc. causes a decrease in reading output. Therefore, like the structure shown in the figure, the primary layer 121/antiferromagnetic layer 129 can be used as a part of the lower electrode when the primary layer 121/antiferromagnetic layer 129 are patterned wider than the track width, and it is effective in deterring the decrease in the reading output.

In this embodiment, the primary layer 121/antiferromagnetic layer 129 are shown as a shape not etched, but a part of the primary layer 121/antiferromagnetic layer 129 may be etched in the film-thickness direction. Conversely, in addition to the primary layer 121/antiferromagnetic layer 129, a part of the longitudinal biasing layer 128 may be etched in the film-thickness direction.

Since the resistance of the nonmagnetic tunneling barrier layer is large enough in a TMR head using a nonmagnetic tunneling barrier layer as the layer 125, the decrease in reading output caused by parasitic resistance is hardly observed. Thus, like the first embodiment shown in FIG. 1, patterning may be done to the primary layer 121/antiferromagnetic layer 129 in the track width dimension. It is similar in the CPP-GMR head in the case where a high enough reading output is expected.

Next, each component of the magnetoresistive head shown in FIGS. 1 and 2 will be described.

Commonly used materials for the substrate 100, the lower shield 110, the upper shield 150, and the insulator films 140 and 141 are shown as one example, because they are not necessary limited in the present invention. AlTiC, SiC, or those coated with $Al_2O_3$ are used for the substrate 100. Single or multi-layer films selected from Ni—Fe alloys and their nitrates, Co—Zr, Co—Hf, or Co—Ta system amorphous alloys, etc. are used for the lower shield 110 and the upper shield 150. It is simple that they can be formed by a sputtering method and a plating method. Short circuits between the lower shield 110 and the upper shield 150 can be prevented by using $Al_2O_3$, $SiO_2$, AlN, SiN, or mixtures thereof and multi-layer films as the insulator films 140 and 141. These are preferably formed by a sputtering method.

The magnetoresistive film 120 is preferably fabricated by a sputtering method from the viewpoint of film-thickness, controllability of alloy composition, and mass-production efficiency. An example of the film configuration of the magnetoresistive film 120 is as follows. For instance, Ta (2.5)/ $Ni_{47}Cr_{40}Fe_{13}$ (3.5)/$Ni_{85}Fe_{15}$ (1)/Ru(0.5)/$Co_{50}Fe_{50}$ (2.15)/Ru (0.35)/$Co_{90}Fe_{10}$ (2.5)/Al (0.45)-oxide/$Co_{90}Fe_{10}$ (0.5)/ $Ni_{85}Fe_{15}$ (3)/Ru (0.8)/Cu (0.6)/ $Co_{90}Fe_{10}$ (2.5)/$Mn_{52}Pt_{48}$ (14)/Ta (5), etc. Herein, the number shown in ( ) is the film-thickness, and the unit is nm. The unit of each alloy component showing the subscript of each element is at %. Ta (2.5)/ $Ni_{47}Cr_{40}Fe_{13}$ (3.5)/$Ni_{85}Fe_{15}$ (1)/Ru (0.5), $Co_{50}Fe_{50}$ (2.15), Ru (0.35), $Co_{90}Fe_{10}$ (2.5), Al (0.45)-oxide, $Co_{90}Fe_{10}$ (0.5)/ $Ni_{85}Fe_{15}$ (3), Ru (0.8)/Cu (0.6), $Co_{90}Fe_{10}$ (2.5), $Mn_{52}Pt_{48}$ (14), and Ta (5) correspond to the primary layer 121, the first magnetic layer 122, the antiferromagnetic coupling layer 123, the second magnetic layer 124, nonmagnetic tunneling barrier layer 125, the magnetic free layer 126, the nonmagnetic separate layer 127, the longitudinal biasing layer 128, the antiferromagnetic layer 129, and the protection layer 130, respectively.

Besides a single layer film, for instance Ni—Fe or Co—Fe, etc., a magnetic multilayer film such as Co—Fe/Ni—Fe or Co—Fe/Ni—Fe/Co—Fe etc. may be used for the first magnetic layer 122, the second magnetic layer 124, the magnetic free layer 126, and the longitudinal biasing layer 128, which are components of the magnetoresistive film 120. Moreover, a so-called synthetic ferrimagnetic structure such as Co—Fe/ Ni—Fe/Ru/Ni—Fe may be used for the magnetic free layer 126.

A material containing Fe, Co, and Ni as the main component which has a high spin polarization ratio at the Fermi energy is used for the second magnetic layer 124 and the magnetic free layer 126 to make the MR ratio larger which strongly affects the reading output. Moreover, it is more useful to use Heusler alloys such as $Co_{50}Mn_{25}Ge_{25}$ and $Co_{50}Mn_{25}Si_{25}$, etc., or half metals such as $Fe_3O_4$ which have a larger spin polarization ratio. Furthermore, it is desirable that the composition and film thickness of the magnetic free layer 126 be properly adjusted to exhibit low magnetostriction and low coercivity besides the MR ratio, and that attention be paid to make small the interlayer coupling field with the second magnetic layer 124.

The expression "Al (0.45)-oxide" for the nonmagnetic tunnel barrier layer 125 means that it uses a so-called natural oxidation method, in which oxygen is introduced in the chamber after the deposition of an Al film. If control is possible to prevent excess oxidation, methods such as radical oxidation and plasma oxidation may be used, and an oxide film may be formed by reactive sputtering, and $Al_2O_3$ directly deposited. Additionally, besides Al oxide, an oxide or nitride including Mg, Al, Si, Ti, V, Mn, Zr, Nb, Hf, and Ta may be used.

In the aforementioned example of a TMR head configuration, if the nonmagnetic tunneling barrier layer is substituted for a nonmagnetic conductive layer, an embodiment of the present invention could be used as a CPP-GMR head as it is. As the nonmagnetic conductive layer, Cu, Ag, and Au, etc. may be deposited from about 1 to 5 nm.

A preferable example of the film configuration magnetic free layer 126/nonmagnetic separate layer 127/longitudinal biasing layer 128/antiferromagnetic layer 129/protection layer 130 is $Co_{90}Fe_{10}$ (0.5)/$Ni_{85}Fe_{15}$ (3)/Ru (0.8)/Cu (0.6)/ $Co_{90}Fe_{10}$ (2.5)/$Mn_{52}Pt_{48}$ (14)/Ta (5), etc. If, after being formed, the magnetoresistive film is annealed while applying a magnetic field in the track width direction, a large unidirectional magnetic anisotropy is given to the longitudinal biasing layer $Co_{90}Fe_{10}$ (2.5) by a magnetic exchange coupling with $Mn_{52}Pt_{48}$ (14), thus the magnetization direction can be pinned in the track width direction. Additionally, because the unidirectional magnetic anisotropy has excellent thermal stability, it has high reliability.

Figure 3:
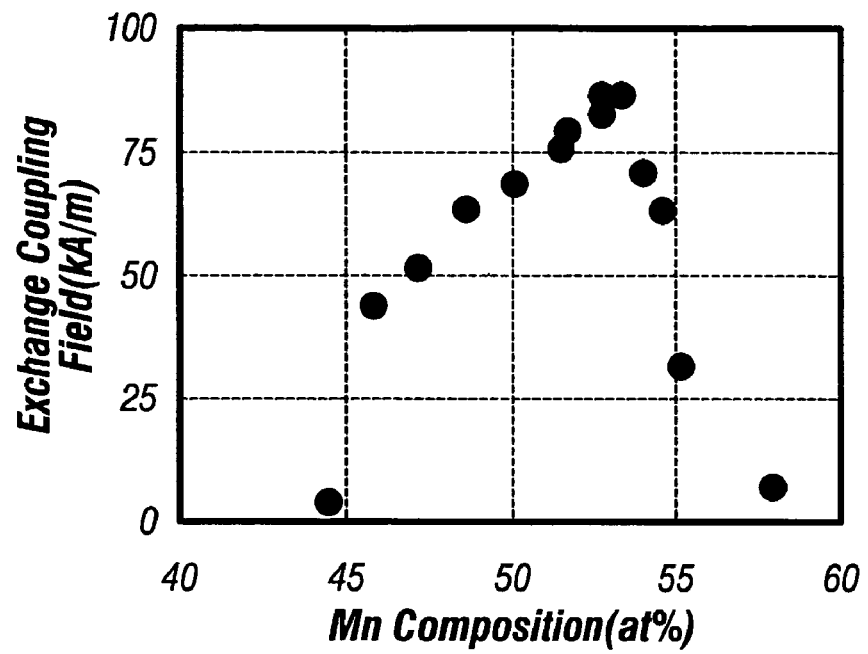
FIG. 3 shows the Mn composition dependence of the magnetic exchange coupling field which is given by the MnPt antiferromagnetic layer.

Here, an example is shown using an ordered alloy $Mn_{52}Pt_{48}$ as the antiferromagnetic layer 129 which pins the magnetization direction of the longitudinal biasing layer 128 in one direction. FIG. 3 shows the Mn composition dependence of the magnetic exchange coupling field which was obtained in the spin valve film including glass substrate/ $Ni_{47}Cr_{40}Fe_{13}$ (3.2)/$Ni_{85}Fe_{15}$ (0.8)/MnPt (14)/$Co_{90}Fe_{10}$ (2)/ Cu (2.5)/$Co_{90}Fe_{10}$ (1.5)/$Ni_{85}Fe_{15}$ (2.5)/Ta (2). After film deposition, an annealing treatment at 270° C. for 3 hours was given to these samples while applying a magnetic field of 1.1 MA/m. Greater magnetic exchange coupling fields are obtained in Mn compositions from about 45 at % to 55 at %. That is, in this composition range, at least a part of the Mn—Pt alloy is phase-transformed by annealing to a Cu—Au type ordered lattice and becomes antiferromagnetic, imparting a large magnetic exchange coupling field (unidirectional magnetic anisotropy) to the adjoining magnetic layer. A large magnetic exchange coupling field can also be obtained in a similar composition range in the case where an ordered alloy antiferromagnetic film is used, in which the alloy is expressed by Mn-$M_1$ where $M_1$ includes at least one element selected from Ni, Ru, Rh, Pd, Re, Os, Ir, or Pt.

Figure 4:
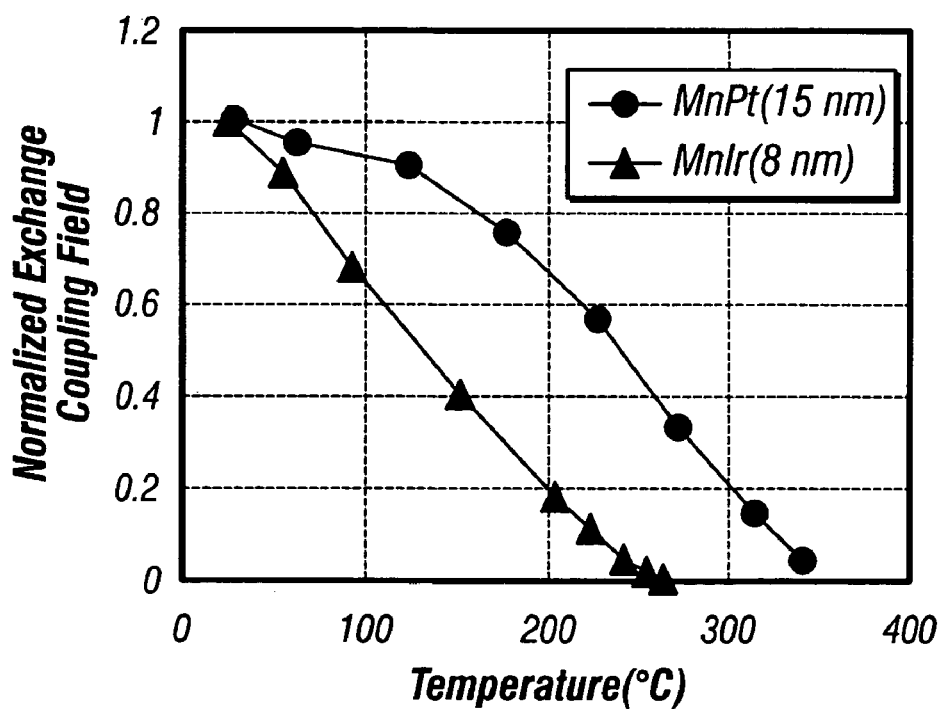
FIG. 4 shows the temperature dependence of the magnetic exchange coupling field which is given by the MnPt and MnIr films.

As another candidate of a material for the antiferromagnetic layer 129, it may be possible to use a disordered alloy antiferromagnetic film which is expressed by Mn-$M_2$ (where $M_2$ is a material including at least one element selected from Cr, Fe, Ru, Pd, Ir, or Pt) such as, for example, $Fe_{50}Mn_{50}$ and $Mn_{80}Ir_{20}$. FIG. 4 shows the comparison of temperature characteristics of magnetic exchange coupling fields applied to the magnetic film between $Mn_{48}Pt_{52}$, which is representative of an ordered alloy antiferromagnetic film expressed by Mn-$M_1$, and $Mn_{80}Ir_{20}$, which is representative of a disordered alloy antiferromagnetic film expressed by Mn-$M_2$. The vertical axis shows values which are obtained by normalizing the magnetic exchange coupling fields measured at each temperature by the magnetic exchange coupling fields measured at room temperature. The Blocking temperature (a temperature where the magnetic exchange coupling field disappears) of $Mn_{48}Pt_{52}$ is higher than that of $Mn_{80}Ir_{20}$. The magnetic exchange coupling field of $Mn_{48}Pt_{52}$ decreases slowly up to 150° C., while the value of $Mn_{80}Ir_{20}$ decreases linearly with increasing temperature. This means that $Mn_{48}Pt_{52}$ has better thermal stability for the magnetic exchange coupling field applied to the magnetic film compared to $Mn_{80}Ir_{20}$. Therefore, in order to insure high reliability of a magnetic head, it is not adequate to use for the antiferromagnetic layer 129 a disordered alloy expressed by Mn-$M_2$ (where $M_2$ is a material including at least one element selected from Cr, Fe, Ru, Pd, Ir, or Pt) such as $Fe_{50}Mn_{50}$ and $Mn_{80}Ir_{20}$. On the other hand, it is preferable to use an ordered alloy which contains Mn from about 45 at % to 55 at % and is expressed by Mn-$M_1$ (where $M_1$ is a material including at least one element selected from Ni, Ru, Rh, Pd, Re, Os, Ir, and Pt) such as $Mn_{52}Pt_{48}$.

Additionally, Ru (0.8)/Cu (0.6) is used as the nonmagnetic separate layer in this embodiment to couple antiferromagnetically the magnetic free layer 126 with the longitudinal biasing layer 128. Cr, Cu, Ru, Rh, Pd, Re and Ir and their alloys and multi-layer films may be used as the nonmagnetic separate layer 127 which generates antiferromagnetic coupling. However, if the antiferromagnetic coupling between the magnetic layer 126 and the longitudinal biasing layer 128 is made too strong, the problem of decreasing output arises because the magnetization of the magnetic free layer 126 becomes difficult to rotate by the signal field from the medium. Like the aforementioned example, the strength of the antiferromagnetic coupling can be set arbitrarily by making the nonmagnetic separate layer 127 multilayer and by making the film-thickness thicker.

Figure 5:
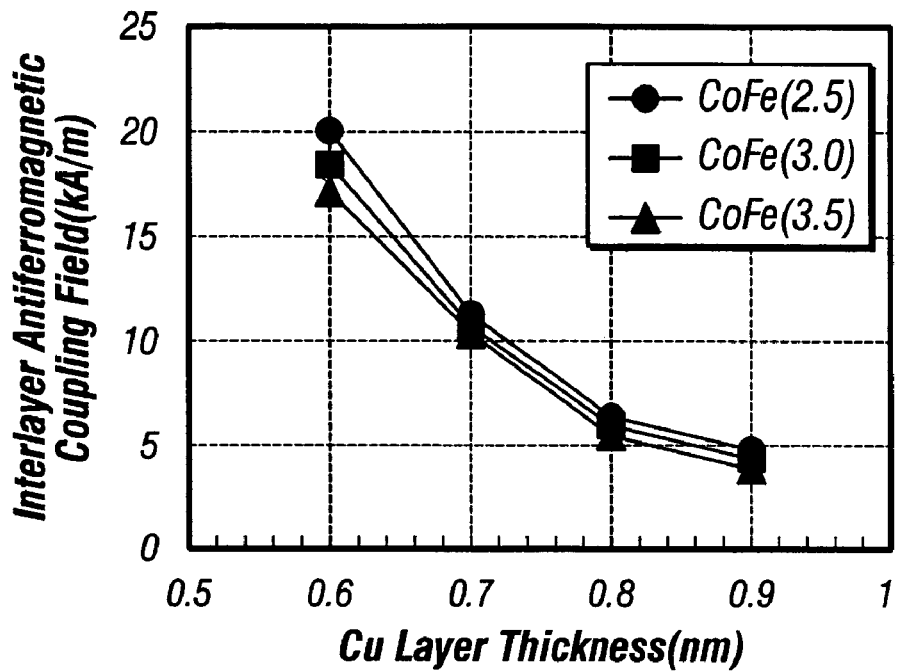
FIG. 5 shows the nonmagnetic separate Cu film thickness dependence of the antiferromagnetic coupling field which acts in the interlayer between the free layer and the longitudinal biasing layer.

FIG. 5 shows the Cu film-thickness dependence of the interlayer antiferromagnetic coupling field between the magnetic free layer 126 and the longitudinal biasing layer 128. The sample configuration is glass substrate/Ta (2.5)/$Co_{90}Fe_{10}$ (0.5)/$Ni_{85}Fe_{15}$ (3)/Ru (0.8)/Cu (t)/$Co_{90}Fe_{10}$ (2.5, 3.0, 3.5)/$Mn_{52}Pt_{48}$ (9)/Ta (6), and, after film deposition, the magnetization direction of $Co_{90}Fe_{10}$ (2.5, 3.0, 3.5) is pinned by annealing at 270° C. for 3 hours while applying a magnetic field of 1.1 MA/m. It is understood that the interlayer antiferromagnetic coupling field is continuously variable corresponding to the thickness of the Cu layer. Therefore, the material and film-thickness of the nonmagnetic separate layer 127 can be properly controlled to reconcile high field sensitivity and the bias effect in the track width direction for making the magnetic free layer 126 single domain.

Next, a detailed explanation will be given of the film configuration of the pinned layer in the magnetoresistive layer.

Figure 6:
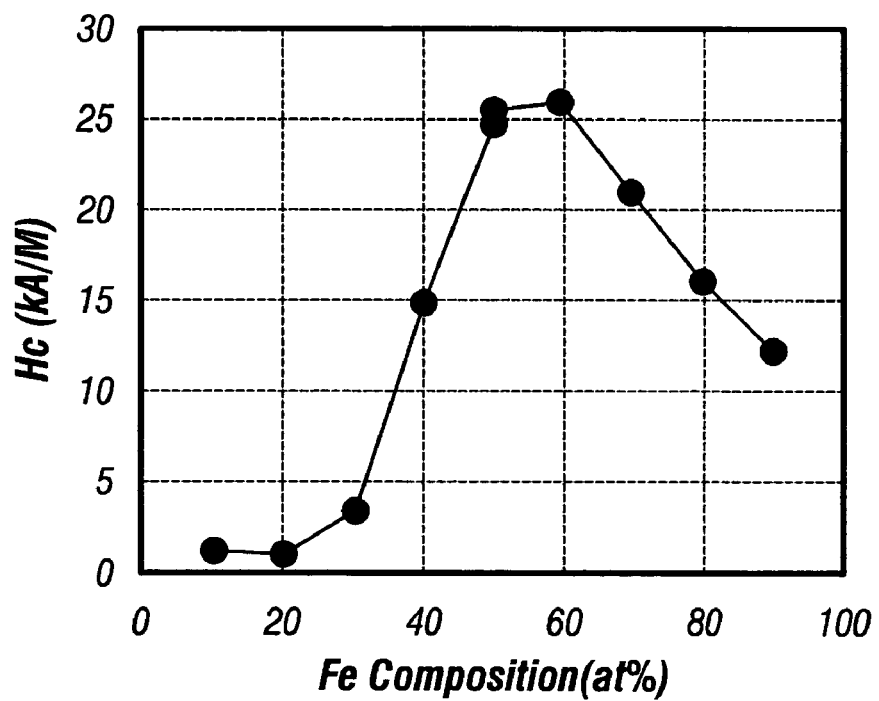
FIG. 6 shows the change in the coercivity of Co—Fe alloys with respect to Fe composition.

In order to strongly pin the magnetization direction of the pinned layer even if an external field is applied, at least one of a plurality of magnetic layers constituting the pinned layer may include a hard magnetic material. FIG. 6 shows the Fe composition dependence of coercivity Hc in Co—Fe alloys. The measured sample configuration is glass substrate/ $Ni_{47}Cr_{40}Fe_{13}$ (3.2)/$Ni_{85}Fe_{15}$ (0.8)/$Mn_{52}Pt_{48}$ (14)/$Co_{90}Fe_{10}$ (1.8)/Ru (0.5)/$Co_{90}Fe_{10}$ (2.5)/Cu (2.5)/Co—Fe (2)/Ru (1)/Ta (2), and the coercivity Hc of Co—Fe (2) placed as the free layer was evaluated from the magnetoresistive transfer curve of the CIP-GMR. While depositing the GMR film a magnetic field of 8 kA/m is always applied unidirectionally (perpendicular to the medium) to induce the uniaxial magnetic anisotropy into the magnetic film. After deposition of the GMR film, it was annealed in vacuum at 270° C. for 3 hours in a magnetic field of 1.1 MA/m in order to pin the magnetization direction of the $Co_{90}Fe_{10}$ (1.8). This time, the directions of the applied field and the measuring applied field were set to be the same as the direction of the applied field during film deposition. The coercivity Hc of the Co—Fe showed a maximum value at an Fe composition of around 50 at %, and a large value of about 25 kA/m was obtained. Moreover, addition of a noble metal such as Pt and Pd etc. or of an element such as V, Cr, Nb, Mo etc. is even more effective to enhance the coercivity.

Figure 7:
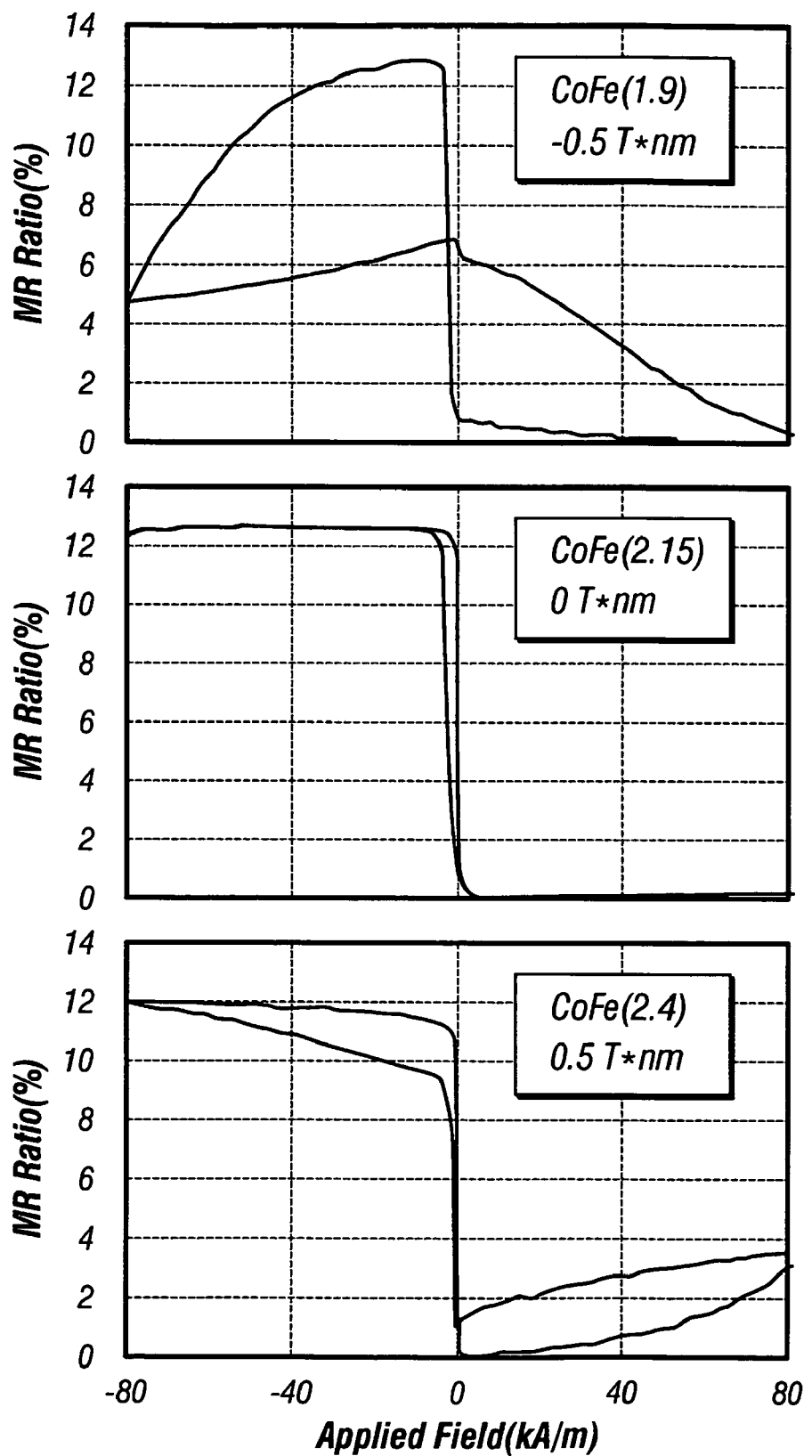
FIG. 7 shows a comparison of magnetoresistive transfer curves for different Co—Fe film thickness of the pinned layer.

Next is shown the magnetoresistive transfer curve of the CIP-GMR including glass substrate/$Ni_{47}Cr_{40}Fe_{13}$ (4.2)/Ru (0.45)/$Ni_{85}Fe_{15}$ (0.5)/$Co_{90}Fe_{10}$ (1.5)/Cu (1.9)/$Co_{90}Fe_{10}$ (2.5)/Ru (0.35)/$Co_{50}Fe_{50}$ (t)/Ru (1)/Ta (2). Depositions of the free layer $Ni_{85}Fe_{15}$ (0.5)/$Co_{90}Fe_{10}$ (1.5) and the pinned layer $Co_{90}Fe_{10}$ (2.5)/Ru (0.35)/$Co_{50}Fe_{50}$ (t) were carried out in a magnetic field of 8 kA/m perpendicular to the track width direction and medium, respectively. As representative examples, the magnetoresistive transfer curves of the $Co_{50}Fe_{50}$ film thicknesses of 1.9 nm, 2.15 nm, and 2.4 nm are shown in FIG. 7. The measuring field direction is the same as the direction applied during the deposition of the pinned layer. In the case where the film-thickness of the $Co_{50}Fe_{50}$ is 2.15 nm, it is understood that the magnetization direction of the $Co_{90}Fe_{10}$ (2.5)/Ru (0.35)/$Co_{50}Fe_{50}$ (2.15) pinned layer does not change even if the magnetic field of ±80 kA/m is applied. The saturation magnetic flux densities of the $Co_{90}Fe_{10}$ and $Co_{50}Fe_{50}$ are 1.8 T and 2.1 T, respectively. Therefore, the magnetic moments of the two magnetic layers laminated through Ru (0.35), which is the antiferromagnetic coupling layer 123, are −0.5 T·nm, 0 T·nm, and 0.5 T·nm, respectively, when they are expressed by $Co_{90}Fe_{10}$ (2.5) magnetic moment—$Co_{50}Fe_{50}$ (t) magnetic moment. Thus, it is shown that the film thickness may be controlled to make the magnetic moment substantially zero in the case where two magnetic layers laminated through the Ru (0.35) which is the antiferromagnetic coupling layer 123 are aligned antiparallel. In many cases, the film-thickness is generally controlled to be around 0.8 nm when Ru is used as the antiferromagnetic coupling layer, but the magnetization direction of the pinned layer can be pinned more strongly when the film-thickness is controlled to be about 0.35 nm as mentioned above.

THIRD EMBODIMENT

Figure 8:
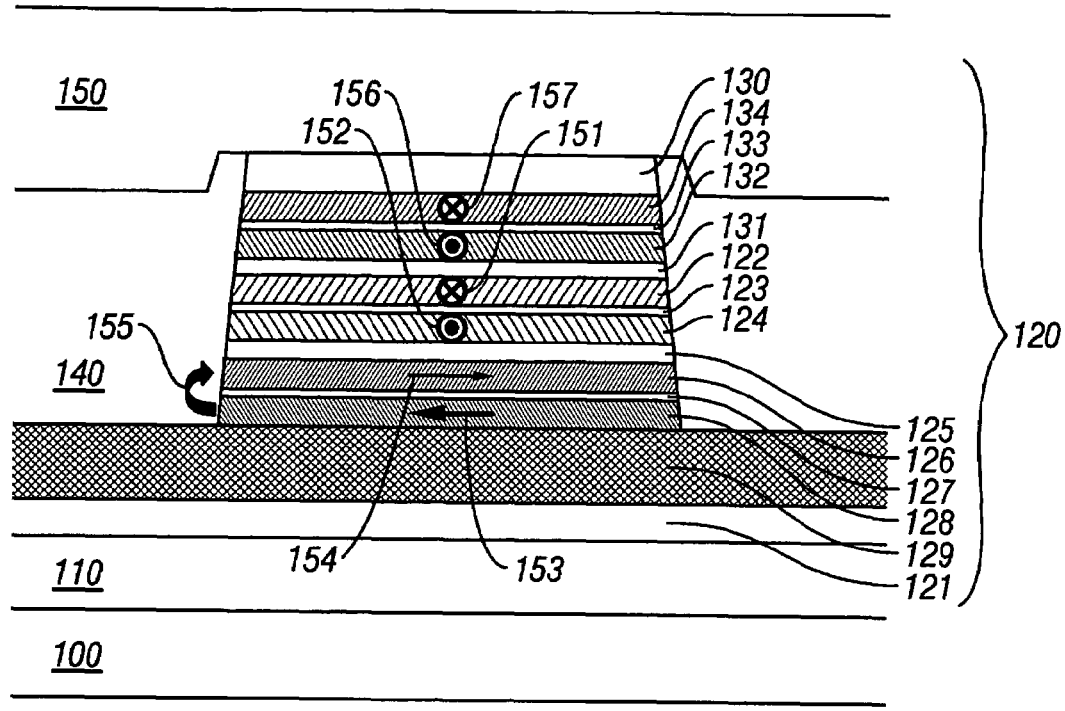
FIG. 8 is a schematic diagram illustrating another embodiment of a magnetoresistive head of the present invention when seen from the air bearing surface.

FIG. 8 is a schematic diagram illustrating the third embodiment of a magnetoresistive head of the present invention when seen from the air bearing surface. The basic configuration is the same as the second embodiment so that the details are omitted.

In this embodiment, the configuration of the pinned layer is fourth magnetic layer 134/third antiferromagnetic coupling layer 133/third magnetic layer 132/second antiferromagnetic coupling layer 131/first magnetic layer 122/first antiferromagnetic coupling layer 123/second magnetic layer 124. Symbols 156 and 157 in the figure indicate the magnetization direction of the third magnetic layer and the magnetization direction of the fourth magnetic layer, respectively. In the first and second embodiments, the configuration of the pinned layer included two magnetic layers. But, when the configuration contains more than three magnetic layers as, for instance, in Co—Fe/Ru/Co—Fe and the third embodiment, the magnetization direction is pinned more strongly.

Figure 9:
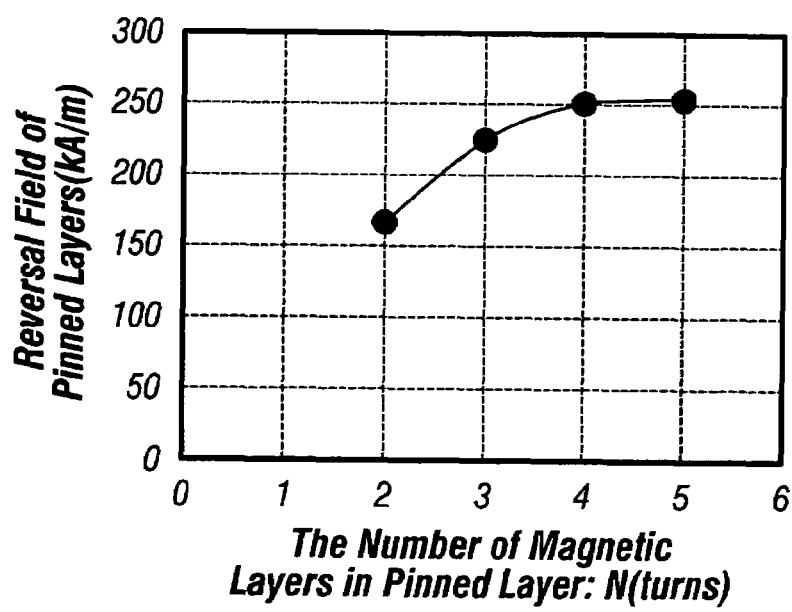
FIG. 9 shows the relationship between the reversal fields of the pinned layer and the number of magnetic layers constituting the pinned layer.

FIG. 9 shows the relationship between the reversal fields of the pinned layer and the number of magnetic layers constituting the pinned layer in the GMR film, which includes glass substrate/$Ni_{47}Cr_{40}Fe_{13}$ (4.2)/Ru (0.45)/$Ni_{85}Fe_{15}$ (0.5)/$Co_{90}Fe_{10}$ (1.5)/Cu (1.9)/$Co_{90}Fe_{10}$ (2.5)/[Ru (0.35)/$Co_{90}Fe_{10}$ (2.5)]$_{N-1}$/Ru (1)/Ta (2). As clearly shown in this figure, the larger number of magnetic layers in the pinned layer and the larger reversal field of the pinned layer make it possible to expect stable reading characteristics. Moreover, because it is possible to increase the degree of freedom of the material and film-thickness constituting each layer, desired characteristics can be easily obtained by controlling theses factors properly. When the configuration, in which the number of magnetic layers in the pinned layer is increased, is applied to a CIP-GMR, a reduction in reading output is brought about due to the influence of splitting loss. However, this effect does not become a problem in a TMR and CPP-GMR which are the targets of the present invention. It is preferable that the number of laminating layers be properly controlled because the total film-thickness of the magnetoresistive film increases and it becomes a disadvantage to make the gap of the upper and lower shields narrower when the number of laminating layers is increased more than is necessary.

As mentioned above, the magnetization direction of the pinned layer can be pinned strongly against an external magnetic field by the following conditions: at least two magnetic layers are included in the pinned layer, the magnetic layers are laminated through the antiferromagnetic coupling layer, the adjacent aforementioned magnetic layers include a laminated body antiferromagnetically coupling with each other, at least one magnetic layer includes a hard magnetic material with a large coercivity, and the film-thickness of each magnetic layer is controlled to make the magnetic moment almost substantially zero when the magnetization of each magnetic layer is aligned antiparallel. The material and film-thickness of each layer may be properly controlled within a range meeting these conditions.

FOURTH EMBODIMENT

In the so-called CPP type magnetoresistive head, in which a sense current flows in the film-thickness direction of the magnetoresistive film, a short-circuit occurs on the air bearing surface between the pinned layer and free layer because of the influence of smearing in the lapping process of air bearing surface, thereby the yield may be reduced. In order to avoid this, it is preferable that a so-called flux guide type head structure be adopted. That is, it is a structure in which the pinned layer or the free layer is not exposed and short circuit of the sensor is prevented. In this structure, the configuration of the present invention can be flexibly applied as it is.

Figure 10:
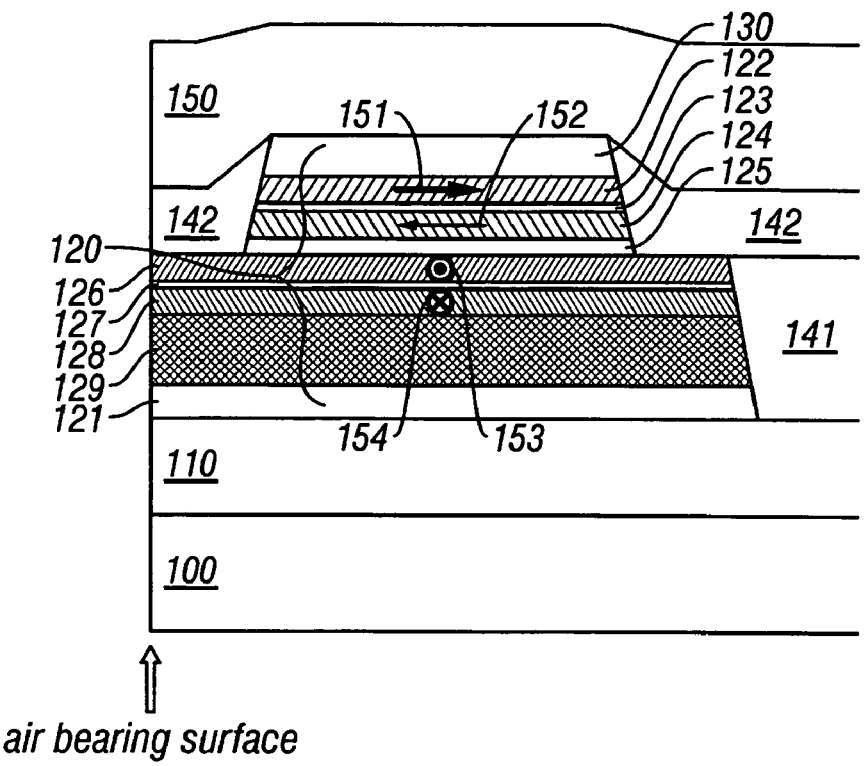
FIG. 10 is a cross-section illustrating an example of the sensor height direction in a magnetoresistive head of the present invention.

FIG. 10 is a cross-section illustrating a sensor height direction at the track center in a magnetoresistive head of the fourth embodiment according to the present invention. An outline of the magnetic head fabrication procedure will be described below. The magnetoresistive film 120 is formed on the substrate 100 after forming the lower shield 110. In this embodiment, it is preferable that the magnetoresistive film 120 include primary layer 121/antiferromagnetic layer 129/longitudinal biasing layer 128/nonmagnetic separate layer 127/magnetic free layer 126/nonmagnetic conductive layer or nonmagnetic tunneling barrier layer 125/second magnetic layer 124/antiferromagnetic coupling layer 123/first magnetic layer 122/protection layer 130, in which the pinned layer is formed on the side far from the substrate 100 as shown in the second embodiment, and that a part of the magnetic free layer 126, to which the bias field is applied along the track width direction, is used as a flux guide introducing the signal field by antiferromagnetic layer 129/longitudinal biasing layer 128/nonmagnetic separate layer 127. The magnetoresistive film 120 is formed in a desired pattern in the track width direction using photolithography, ion milling or reactive ion etching. Next, the insulator layer 140 is formed at both edge parts of the track width direction in the magnetoresistive film 120 using a lift-off method (same as the second embodiment above).

The magnetoresistive film 120 is patterned in a desired pattern in the sensor height direction using photolithography, ion milling or reactive ion etching. Moreover, it is patterned to a smaller dimension and in a desired pattern in the sensor height direction using photolithography, ion milling or reactive ion etching. Ion milling and reactive ion etching are carried out using equipment having an end-point detect function such as a mass spectrometer, etc., thereby layers from the top protection layer 130 to the nonmagnetic conductive layer or the nonmagnetic tunneling barrier layer 125 are etched while the layers below the magnetic free layer 126 are left unetched. If it is in the range where the magnetic moment of the magnetic free layer 126 is not reduced to an extreme, the surface of the magnetic free layer 126 might be slightly overetched. Moreover, in addition to the layers below the magnetic free layer 126, a part of the nonmagnetic conductive layer or the nonmagnetic tunneling barrier layer 125 may not be milled. Next, the insulator layer 142 is formed using a lift-off method at both edges of the sensor height direction of the magnetoresistive layer 120. Finally, the upper shield 150 is formed, and the electrical resistivity change of the magnetoresistive film 120 is then detected by the lower shield 110 and the upper shield 150. As described in the first embodiment, the order of patterning the magnetoresistive film 120 may be exchanged between the track width direction and the sensor height direction.

As shown in FIG. 10, the case where the layers below the magnetic free layer 126 are left in the region opposite the air bearing surface when seen from the magnetoresistive film 120 and are made to function as a back flux guide becomes a preferable structure, because the signal field is captured into the free layer more effectively. Because the detailed configuration of the magnetoresistive film 120 is the same as the one described above, it is omitted. It is necessary to pay attention that the flux guide itself does not become a source of noise in the flux guide type magnetoresistive head. In this embodiment, a part of the magnetic free layer 126, to which a longitudinal biasing field is applied in the track width direction, is used as a flux guide by antiferromagnetic layer 129/longitudinal biasing layer 128/nonmagnetic separate layer 127, therefore reading characteristics with high reliability can be obtained without generating Barkhausen noise. Furthermore, this structure has a great advantage for making the gap narrower between the upper and lower shields at the air bearing surface.

FIFTH EMBODIMENT

As track narrowing makes progress, the problem that the magnetic effective track width does not become narrow is obvious even if the patterning dimension is made smaller. In the current hard bias structure, the shield gap has to be greater around both edges of the track width direction compared with around the center part of track width. The reason is that it is not possible that the total layer thickness of the laminated film placed at both edges of the track width direction of the magnetoresistive film (mainly, hard magnetic film/electrode film in the case of a CIP type, and insulator film/hard magnetic film (/insulator film) in the case of a CPP type) is controlled to be thinner than the layer film thickness of the magnetoresistive film. In this case, around both edges of the track width direction, reading sensitivity is low but a problem of so-called "side reading" arises because it is easy for flux to flow into the free layer caused by the wider shield gap, thus the magnetic effective track width cannot be made narrower. It is clear that this problem becomes serious with narrowing track width. A structure of a magnetic head of the present embodiment effectively works to solve this problem.

Figure 11:
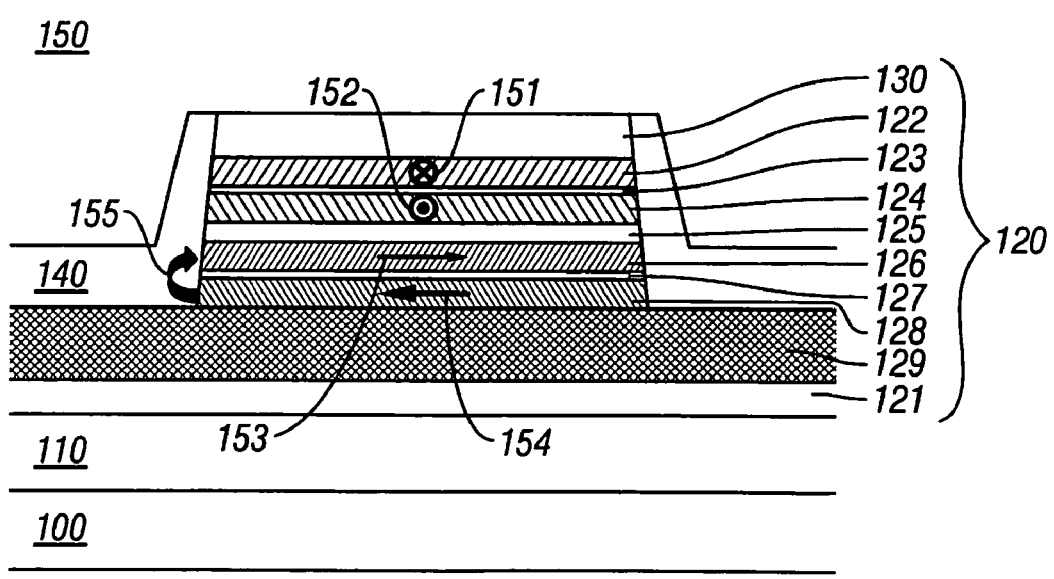
FIG. 11 is a schematic diagram illustrating another embodiment of a magnetoresistive head when seen from the air bearing surface.

FIG. 11 is a schematic diagram illustrating a magnetoresistive head of the fifth embodiment when seen from the air bearing surface according to the present invention. The basic configuration is omitted because it is same as that of the first, second, and third embodiments of the present invention. The important thing is that the shield gap at the side edge parts of the magnetoresistive film 120 is narrower than the shield gap at the area where the magnetoresistive film 120 exists. In the structure of the present embodiment, one only has to place the insulator film 140 which has a minimum film-thickness to prevent the edges of the track width from short-circuiting. Therefore, as shown in FIG. 11, it is possible that the shield gap can be made narrower in the edge parts of the magnetoresistive film 120 than the area where the magnetoresistive film 120 exists. As a result, the influence of "side reading" can be suppressed compared with the hard bias structure, and the magnetic effective track width can be made narrower.

It can be said a more preferable structure is when the aforementioned fifth embodiment is combined with the other embodiments, because it becomes possible to fabricate with high yield a read head exhibiting excellent reading characteristics.

Figure 12:
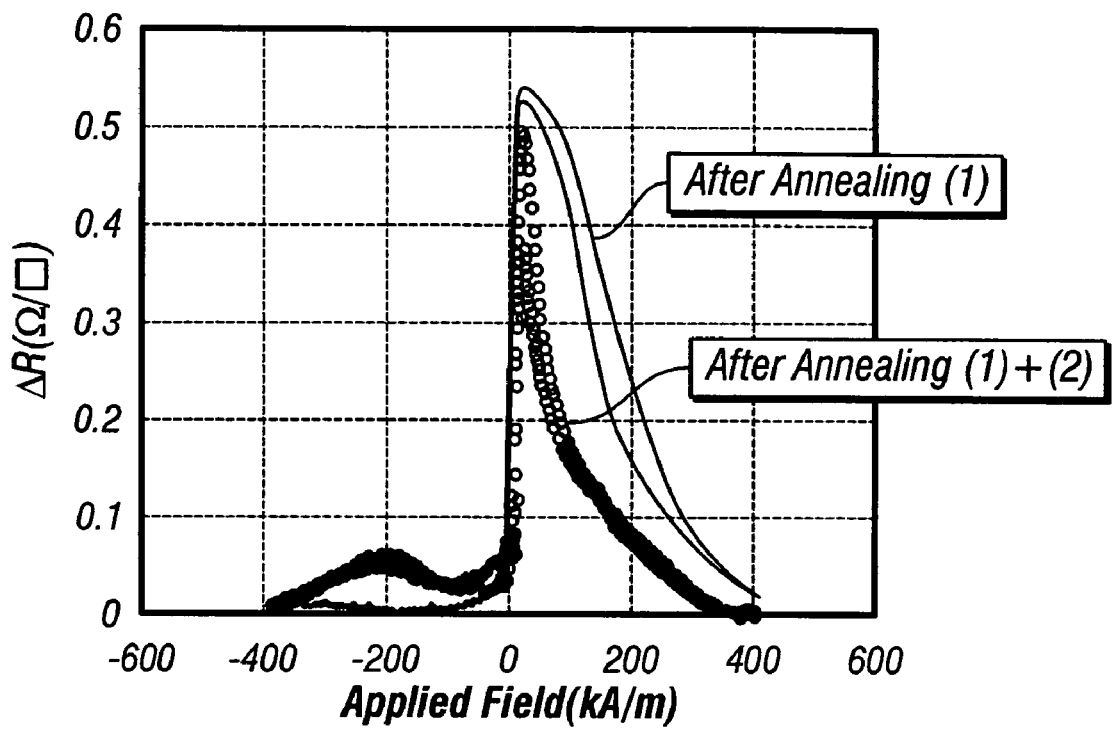
FIG. 12 shows a comparison of the magnetoresistive transfer curves before and after annealing while applying field in the track width direction.

In order to obtain excellent reading characteristics in magnetoresistive heads of the embodiments mentioned above, controlling the magnetization direction of each magnetic layer is very important. First, problems of the prior art are shown based on the experimental results. In this case, a prior art means a configuration, in which nonmagnetic separate layer/longitudinal biasing layer/second antiferromagnetic layer are deposited on a standard spin valve type GMR film or TMR film including first antiferromagnetic layer/pinned layer magnetic film/nonmagnetic conductive layer or nonmagnetic tunneling barrier layer/free magnetic film. Magnetoresistive transfer curves of the GMR films are shown in FIG. 12, wherein an ordered system MnPt alloy is used in both the first antiferromagnetic layer and second antiferromagnetic layer: Ta (2.5)/$Ni_{47}Cr_{40}Fe_{13}$ (3.5)/$Ni_{85}Fe_{15}$ (1)/$Mn_{52}Pt_{48}$ (18)/$Co_{75}Fe_{25}$ (1.5)/Ru (0.8)/$Co_{75}Fe_{25}$ (2)/Cu (1.95)/$Co_{90}Fe_{10}$ (0.5)/$Ni_{85}Fe_{15}$ (3)/Ru (0.8)/Cu (0.7)/$Co_{90}Fe_{10}$ (2.5)/$Mn_{52}Pt_{48}$ (9)/Ta (5).

After depositing the aforementioned GMR film, annealing in a magnetic field is carried out twice in vacuum. The annealing conditions are, in order, (1) 250° C.×9 hours while applying a magnetic field of 1.1 MA/m in the sensor height direction and (2) 250° C.×3 hours while applying a magnetic field of 24 kA/m in the track width direction. The purpose of these conditions is to pin the magnetization of the pinned layer in the sensor height direction and to pin the magnetization of the longitudinal biasing layer in the track width direction, respectively. In the figure, measurement results are shown comparing after annealing (1) and after annealing (1)+(2).

As clearly shown in FIG. 12, the reversal field of the pinned layer is decreased after annealing (1)+(2), and one can see that the magnetization direction of the pinned layer is shifted from the sensor height direction due to annealing (2). Namely, this suggests that it is difficult to control the magnetization directions of the pinned layer and longitudinal biasing film to be orthogonal in the case where an ordered system MnPt alloy is used for both the first antiferromagnetic layer and second antiferromagnetic layer. In this case, it is impossible to obtain excellent reading characteristics.

On the other hand, the magnetization directions of the pinned layer and longitudinal biasing layer can be easily controlled in the GMR film in which an ordered system MnPt alloy is used for the first antiferromagnetic layer and a disordered system MnIr alloy is used for the second antiferromagnetic layer: Ta (2.5)/$Ni_{47}Cr_{40}Fe_{13}$ (3.5)/$Ni_{85}Fe_{15}$ (1)/$Mn_{52}Pt_{48}$ (18)/$Co_{75}Fe_{25}$ (1.5)/Ru (0.8)/$Co_{75}Fe_{25}$ (2)/Cu (1.95)/$Co_{90}Fe_{10}$ (0.5)/$Ni_{85}Fe_{15}$ (3)/Ru (0.8)/Cu (0.7)/$Co_{90}Fe_{10}$ (2.5)/$Mn_{80}Ir_{20}$ (9)/Ta (5). In this case, it is because the direction of magnetic exchange coupling field applied to the longitudinal biasing layer by the $Mn_{80}Ir_{20}$ (9) can be changed by annealing at a relatively low temperature and for a short time. The condition of annealing (2) used in this embodiment is 250° C.×10 minutes, and the magnetization direction of the pinned layer is hardly affected by this annealing.

Figure 13:
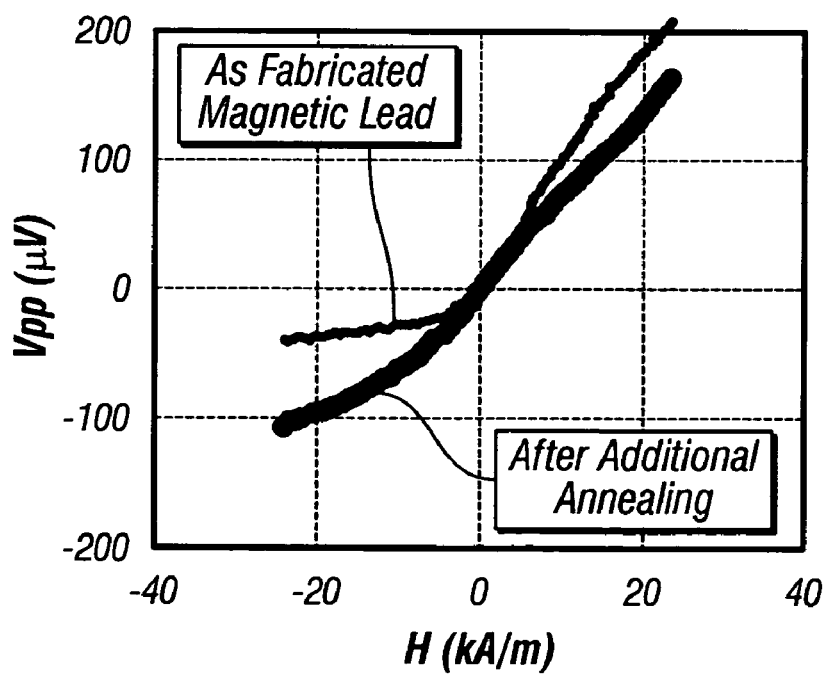
FIG. 13 shows a comparison of the transfer curves between the as-fabricated magnetic head and after additional annealing.

FIG. 13 shows transfer curves of magnetoresistive heads fabricated using the above-mentioned GMR film and annealing condition. The figure shows a comparison between magnetic head as-fabricated and after annealing in a magnetic field (in the track width direction: applied magnetic field of 100 kA/m and 250° C.×10 minutes) for the purpose of controlling the magnetization direction of the longitudinal biasing layer. It is shown that the linearity of the transfer curve is not good in the as-fabricated magnetic head, and that it is improved by annealing in a magnetic field. That is, this suggests that the magnetization of the longitudinal biasing layer is shifted from the track width direction during the lapping process of air bearing surface at the sacrifice of thermal stability of the second antiferromagnetic film.

Figure 14:
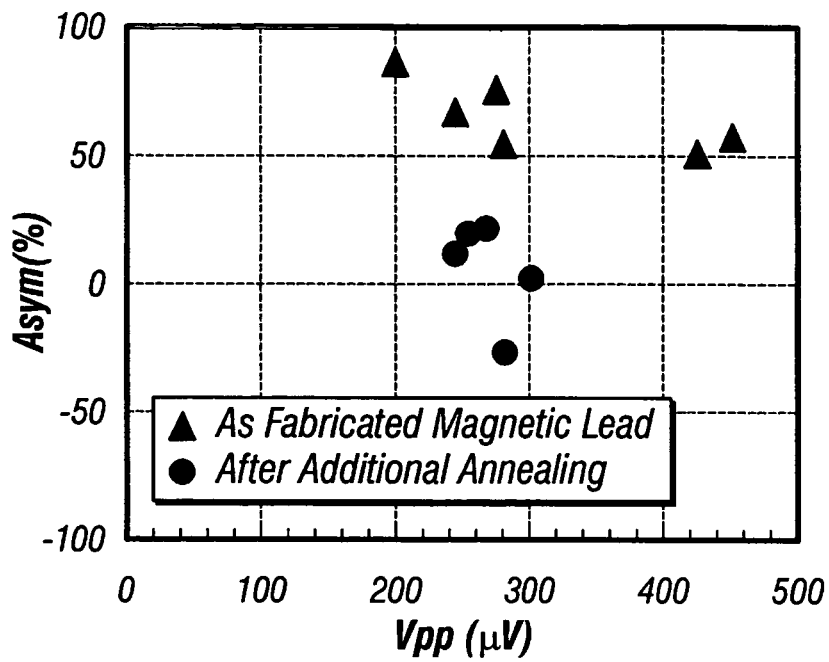
FIG. 14 shows a comparison of the output dependence of the asymmetry between the as-fabricated magnetic head and after additional annealing.

Additionally, FIG. 14 shows the dependence of the output on the asymmetry of the above-mentioned magnetic head. Similarly, the asymmetry could be controlled to be smaller than that of the as-fabricated magnetic head after annealing in a magnetic field. Though excellent reading characteristics seem, at a glance, to be obtained by annealing the as-fabricated magnetic head in a magnetic field to control the magnetization direction of the longitudinal biasing layer, it is not preferable to anneal after the lapping process of air bearing surface because roughness on the air bearing surface is created by differences in the thermal expansion coefficient, therefore, a low air bearing drive becomes difficult, and high reading sensitivity cannot be obtained.

Thus, in the case where the two, first and second, antiferromagnetic layers are used for pinning the magnetization directions of the pinned layer and the longitudinal biasing layer as in the prior art, controlling the magnetization direction becomes difficult, so that a magnetoresistive head with excellent reading characteristics cannot be obtained.

Figure 15:
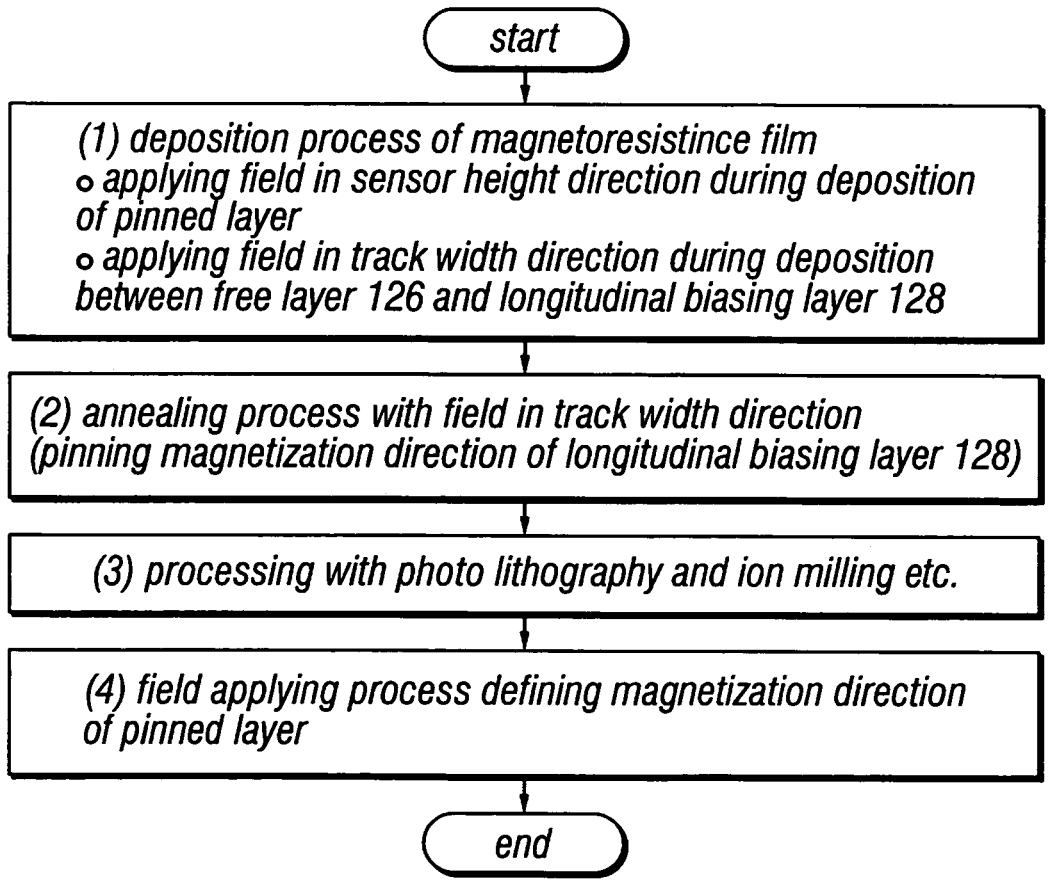
FIG. 15 shows a flowchart of a fabricating method pertaining to magnetization direction control of each magnetic layer.

A magnetization direction controlling method of each magnetic layer according to an embodiment of the present invention will be described below. FIG. 15 shows an outline of the process flow. First, in the case where the pinned layer is fabricated during deposition of the magnetoresistive layer 120, a magnetic field of around 8 kA/m is applied perpendicular to the recording medium (sensor height direction). On the other hand, in the case where magnetic free layer 126/nonmagnetic separate layer 127/longitudinal biasing layer 128 are fabricated, a magnetic field of around 8 kA/m is applied in the track width direction. Thereby, uniaxial magnetic anisotropy may be given in each desired direction. Next, by an annealing step in a magnetic field in the track width direction, the magnetization direction of the aforementioned longitudinal biasing layer is pinned in the track width direction by the magnetic exchange coupling with the adjacent antiferromagnetic layer 129. The magnitude of the magnetic field applied in this annealing process is preferably controlled to be as low as possible to magnetically saturate the magnetic free layer 126 and the longitudinal biasing layer 128, which are laminated to each other through the nonmagnetic separate layer 127. Since the concrete magnitude is estimated to be at most 30 kA/m or less, even if estimated on the high side, the magnetization direction of the pinned layer will never be changed by the magnetic field. Therefore, the magnetization direction of the pinned layer is never shifted from a desired sensor height direction because of the annealing step in a magnetic field which pins the magnetization direction of the longitudinal biasing layer in the track width direction.

Afterwards, an element is formed by using photolithography or ion milling/reactive ion etching/plating etc. (A fabrication process of a write head is included though the details are omitted). Depending on the thermal and magnetic field histories received in the various processes during this step, the magnetization direction of the pinned layer may be shifted from a desired direction. For this problem, it is possible to reset the magnetization direction of the pinned layer in the direction perpendicular to the magnetic recording medium by applying a static field at room temperature (that is, special temperature control is not required) at the final step. That is, an annealing step in a magnetic field, which is carried out by applying a magnetic field in the direction perpendicular to the medium (sensor height direction), is not contained in this series of process flow. Therefore, the magnetization directions of the pinned layer and longitudinal biasing layer 128 can be stabilized in the desired directions, respectively, maintaining orthogonality easily without causing the problem that the magnetization of the longitudinal biasing layer 128 shifts from the track width direction.

Figure 16:
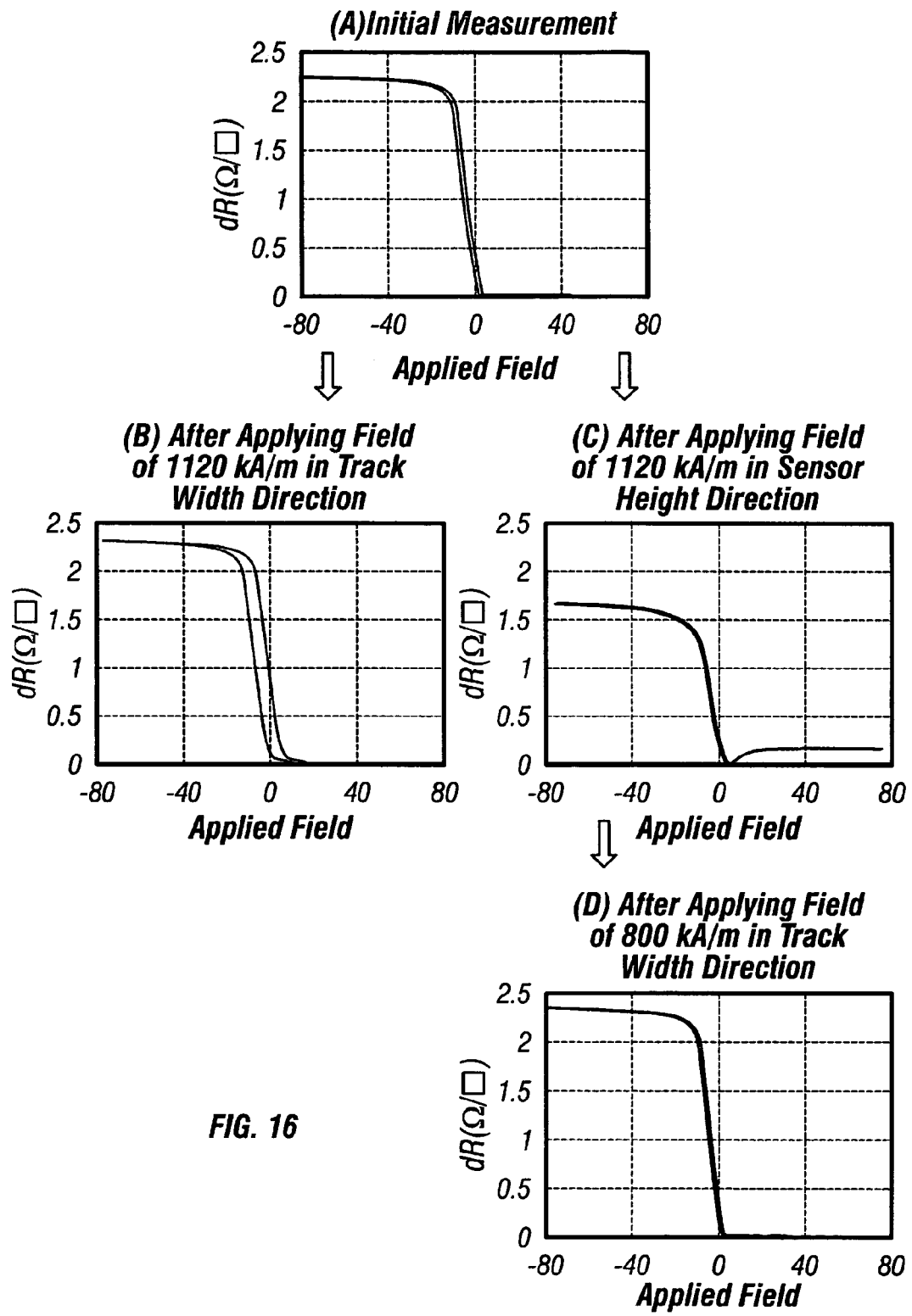
FIG. 16 shows a comparison of the magnetoresistive transfer curves after applying a variety of external fields.

The experimental results carried out using the aforementioned magnetization direction controlling method are shown below. FIG. 16 shows magnetoresistive transfer curves of a CIP-GMR after applying a variety of external fields. The film configuration of the measured sample is glass substrate/ $Ni_{47}Cr_{40}Fe_{13}$ (4.2)/Ru (0.42)/$Ni_{85}Fe_{15}$ (2)/$Co_{90}Fe_{10}$ (1)/Cu (2)/$Co_{90}Fe_{10}$ (2.5)/Ru (0.35)/$Co_{50}Fe_{50}$ (2.3)/Ta (2). The direction of the applied magnetic field during deposition is similar to the one mentioned above. In addition, after deposition, annealing was applied at 250° C. for 3 hours in a magnetic field of 25 kA/m in the track width direction.

As shown in FIG. 16(A), it is understood that the magnetization direction of the pinned layer is pinned in the direction perpendicular to the medium (sensor height direction) in the magnetic field range of at least ±80 kA/m in the initial measurement done after annealing. That is, it is suggested that the annealing carried out in a magnetic field in the track width direction does not influence the magnetization direction of the pinned layer. FIG. 16(B) shows a magnetoresistive transfer curve after applying a magnetic field of 1120 kA/m in the track width direction at room temperature. The magnetoresistive transfer curve profile has a curve profile similar to the one of the initial measurement. Therefore, it is shown that the magnetization of the pinned layer returns reversibly to the direction perpendicular to the medium which was set initially, even if a strong magnetic field is applied in the track width direction.

On the other hand, as shown in FIG. 16(C), one can see in a magnetoresistive transfer curve after applying a magnetic field of 1120 kA/m in a direction perpendicular to the medium that the amount of resistivity change: dR decreases and that the magnetization of the pinned layer is shifted from the set direction perpendicular to the initially set medium, according to the curve profile in +applied field. That is, it is shown that the magnetization of the pinned layer does not reversibly return to the direction perpendicular to the initially set medium when a strong magnetic field not enough to saturate the magnetization of the pinned layer is applied in the direction perpendicular to the medium. Therefore, it is suggested that the magnetization of the pinned layer cannot be controlled to have a desired direction by magnetizing in the direction perpendicular to the medium. However, as shown in FIG. 16(D), a curve profile similar to the initial measurement can be obtained by applying a magnetic field of 800 kA/m again in the track width direction. Therefore, even if the magnetization of the pinned layer is shifted from the direction perpendicular to the initially set medium because of a variety of magnetic field histories during fabrication of the magnetic head, the magnetization of the pinned layer can be set to a desired direction by applying a strong magnetic field in the track width direction at room temperature.

Figure 17:
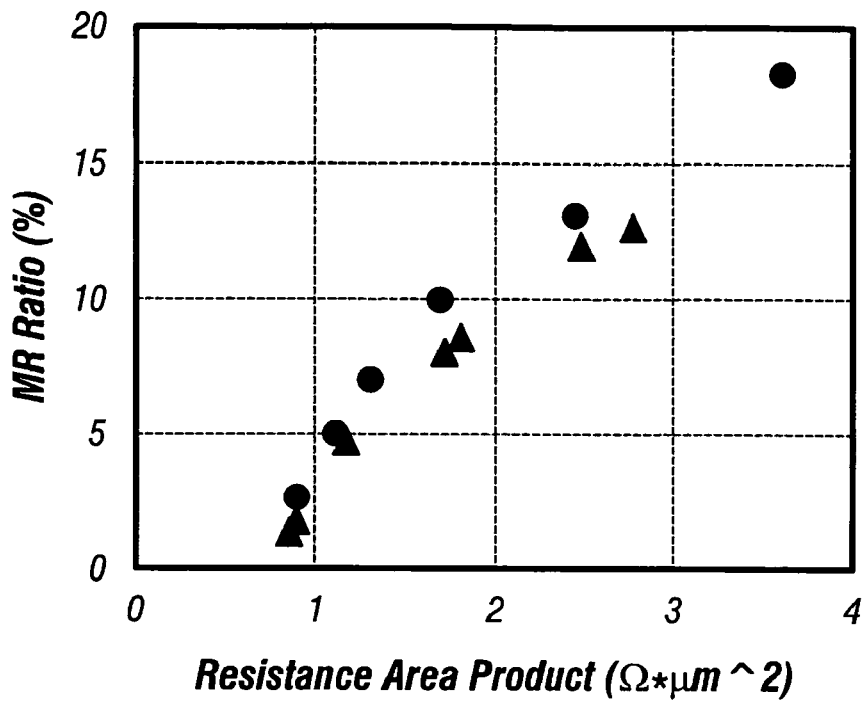
FIG. 17 shows the dependence of MR ratio on resistance area product in a tunneling magnetoresistive element of an embodiment of the present invention.

FIG. 17 shows the dependence of MR ratio on resistance area product in the tunnel magnetoresistive element including Ta (2.5)/$Ni_{47}Cr_{40}Fe_{13}$ (3.5)/$Ni_{85}Fe_{15}$ (1)/Ru (0.5)/$Co_{50}Fe_{50}$ (2.5)/Ru (0.35)/$Co_{90}Fe_{10}$ (2.5)/Al (0.39~0.47)-oxide/ $Co_{90}Fe_{10}$ (0.5)/$Ni_{85}Fe_{15}$ (3)/Ru (0.8)/Cu (0.7)/$Co_{90}Fe_{10}$ (2.5)/$Mn_{52}Pt_{48}$ (14)/Ta (5). The nonmagnetic tunneling barrier layer is fabricated by stopping evacuation after depositing a metallic Al layer, introducing oxygen at a pressure of 200 Pa, and holding for 20 minutes. After deposition of the tunneling magnetoresistive layer, annealing was carried out at 250° C. for 9 hours in a magnetic field of 16 kA/m in the track width direction. The measurement field is applied in the direction perpendicular to the medium.

The tunneling magnetoresistive sensor fabricated by the aforementioned process flow displayed a curve profile of a normal magnetoresistive transfer curve as substantiated by the fact that the magnetization of $Co_{50}Fe_{50}$ (2.5)/Ru (0.35)/ $Co_{90}Fe_{10}$ (2.5) corresponding to the pinned layer is pinned in a desired direction, and a maximum large MR ratio of 18% was obtained. Herein, a result of the tunneling magnetoresistive sensor is shown as an example, but it is clear that a similar result is obtained in a CPP-GMR in which a nonmagnetic layer such as Cu etc. is used in lieu of the tunneling barrier layer having an Al oxide film.

Effects of a magnetoresistive head according to an embodiment of the present invention are shown below compared to the prior art.

Figure 18:
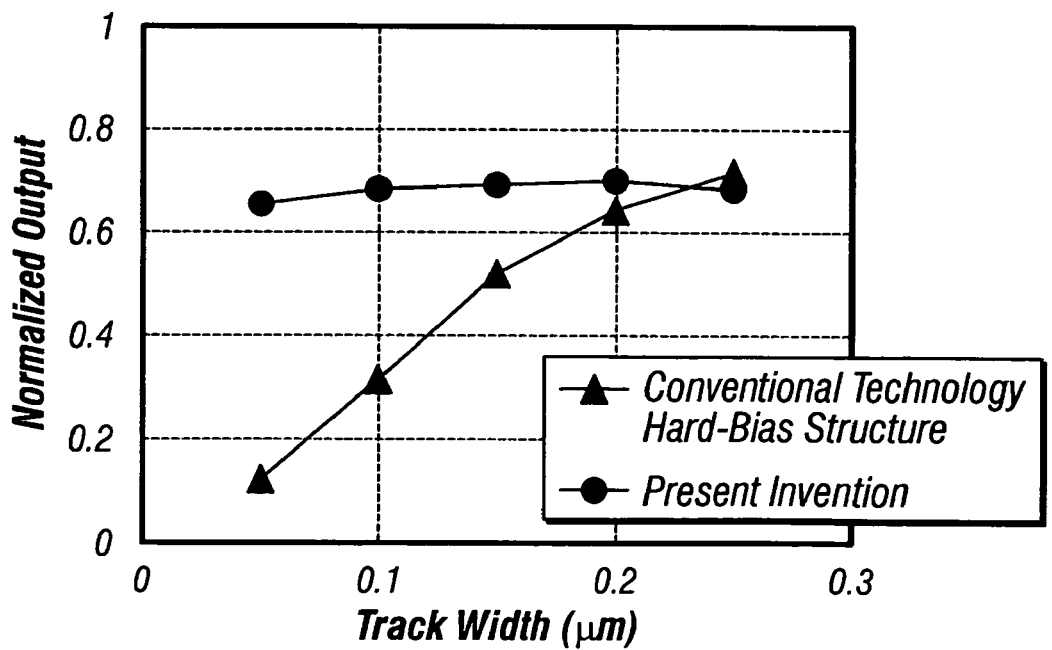
FIG. 18 shows a comparison of the prior art (hard-bias structure) and an embodiment of the present invention regarding the track width dependence of the normalized reading output.

FIG. 18 shows the calculation results of track width dependence of the normalized output in a magnetoresistive head. A comparison between a hard-bias structure, according to the prior art and a structure according to an embodiment of the present invention is shown in this figure. In the hard-bias structure of the prior art, the influence of the insensitive area at the edge part of the sensor becomes remarkable with narrowing track width, resulting in a decrease in output. Particularly, in the case where the track width becomes 0.1 μm or less, output is hardly obtained. On the other hand, in a structure of the present invention, high output can be obtained even if the track width becomes narrower because it is difficult to form an insensitive area at the edge of the sensor.

Figure 19:
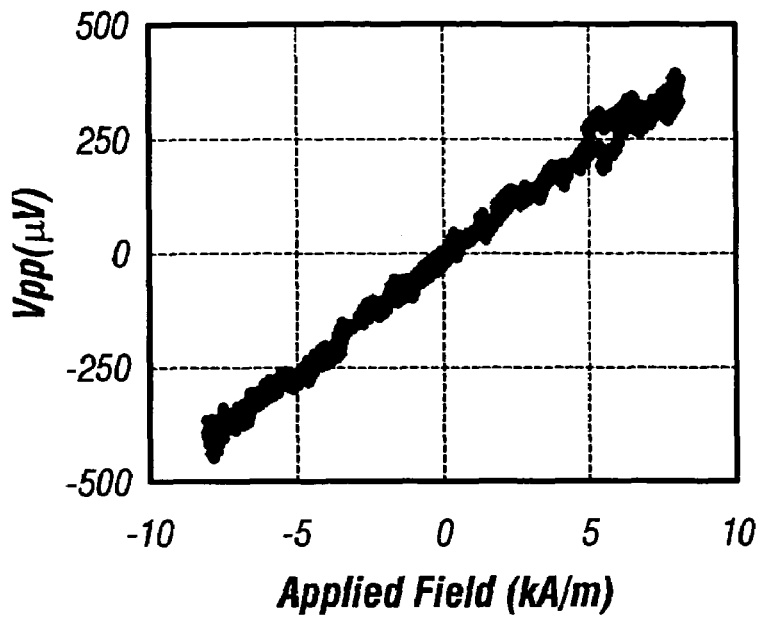
FIG. 19 shows a transfer curve of a TMR head according to an embodiment of the present invention.

FIG. 19 shows a transfer curve of a TMR head fabricated using a structure and fabricating process according to an embodiment of the present invention. The configuration of the TMR film is Ta (2.5)/$Ni_{47}Cr_{40}Fe_{13}$ (3.5)/$Ni_{85}Fe_{15}$ (1)/Ru (0.5)/$Co_{50}Fe_{50}$ (2.15)/Ru (0.35)/$Co_{90}Fe_{10}$ (2.5)/Al (0.46)-oxide/$Co_{90}Fe_{10}$ (0.5)/$Ni_{85}Fe_{15}$ (3)/Ru (0.8)/Cu (0.7)/$Co_{90}Fe_{10}$ (2.5)/$Mn_{52}Pt_{48}$ (14)/Ta (3)/Ru (6). The oxidation condition for the nonmagnetic tunneling barrier layer is 200 Pa and 20 minutes. After deposition, it is annealed at 250° C. for 9 hours while applying a magnetic field of 30 kA/m in the track width direction, thereby pinning the magnetization of the longitudinal biasing layer $Co_{90}Fe_{10}$ (2.5) in the direction of the track width. Although the details are omitted, the read head is fabricated by patterning the TMR film to a track width geometric dimension of 80 nm. Moreover, in the final step of the wafer process, the magnetization of the pinned layer was reset in the sensor height direction by applying a static field of 800 kA/m in the track width direction at room temperature. The measurement results are obtained after these processes and passing the lapping process of air bearing surface. It can be seen that the reading output is great enough and that the linearity of waveform is excellent.

As shown in FIG. 13, there were problems in the linear response in the prior art (the magnetization of both the pinned layer and the longitudinal biasing layer are pinned in the antiferromagnetic layer) after fabricating the head (after lapping process of air bearing surface). On the other hand, according to the embodiment of the present invention, because the magnetization of the longitudinal biasing layer is pinned by an ordered system MnPt alloy which has excellent thermal stability, the magnetization direction does not shift from the track width direction and excellent reading characteristics are obtained even after passing the lapping process of air bearing surface.

SIXTH EMBODIMENT

Figure 20:
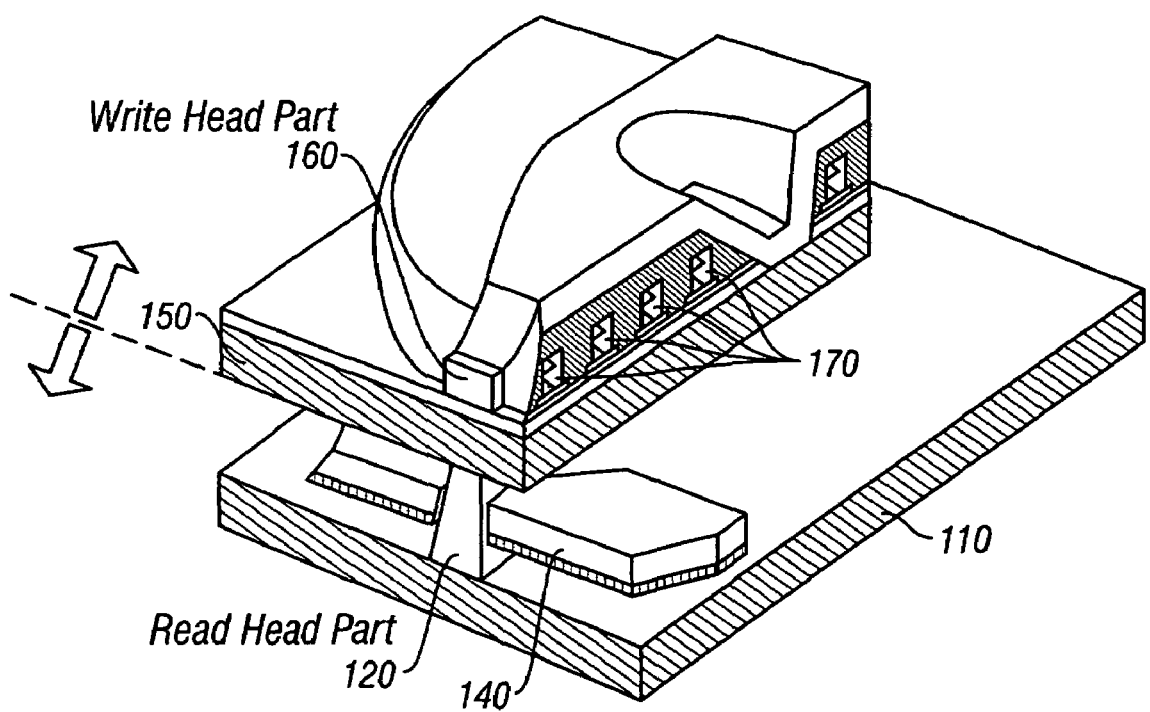
FIG. 20 is a schematic diagram illustrating a magnetic head according to an embodiment of the present invention.

FIG. 20 is a schematic drawing illustrating a write/read composite magnetic head according to the sixth embodiment of the present invention. Although the details are omitted, the figure illustrates a configuration in which a write head mainly including the magnetic pole 160 and the coil 170 is fabricated after fabricating a magnetoresistive head (read head) by the aforementioned method. The write head structure may be for longitudinal magnetic recording or perpendicular magnetic recording. After wafer processing is complete, information can be written to/read from the magnetic recording medium when it is incorporated into the magnetic recording system through the slitting step, the lapping step of air bearing surface, and the assembly step.

Figure 21:
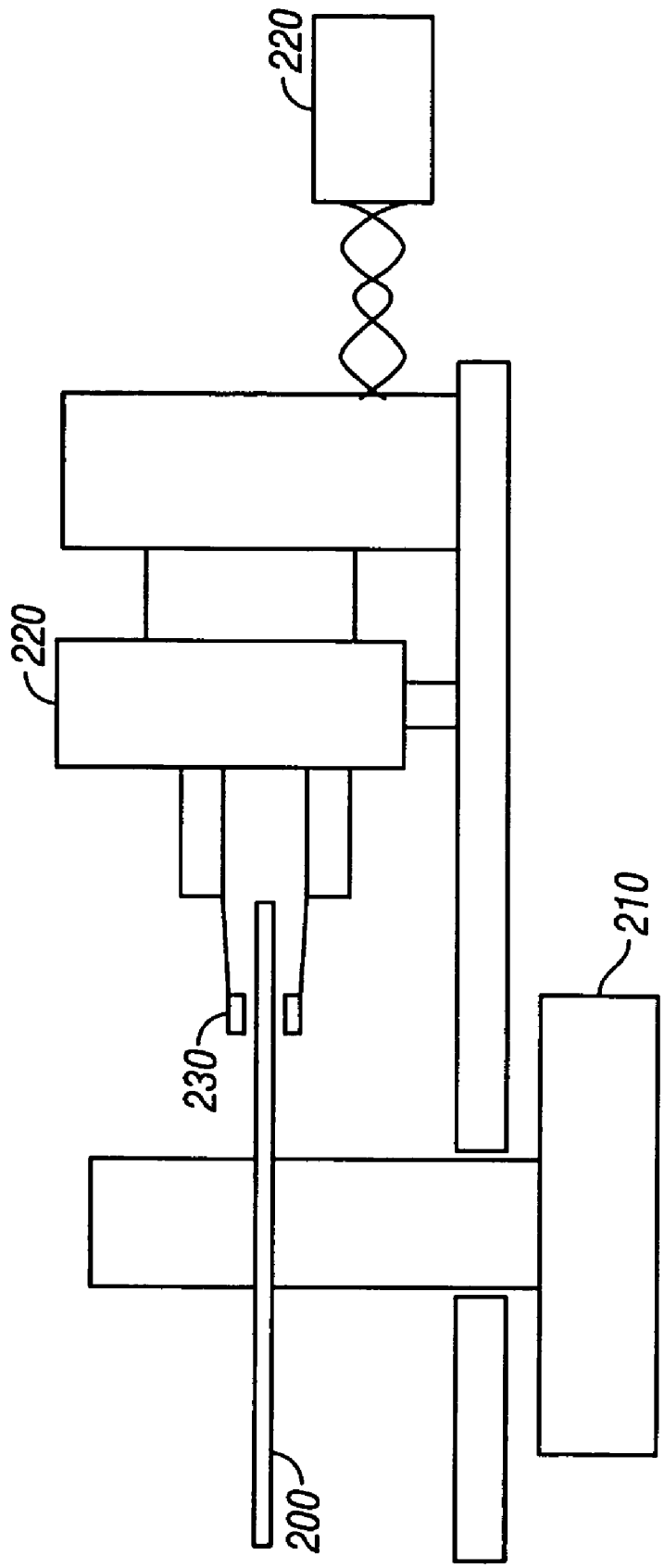
FIG. 21 is a schematic diagram illustrating a magnetic recording system according to an embodiment of the present invention.

FIG. 21 is a schematic diagram illustrating a magnetic recording system according to an embodiment of the present invention. The magnetic recording medium 200, in which information is magnetically recorded, is driven by rotation of the spindle mortar 210, and the head slider 230 is introduced onto the track of the magnetic recording medium 200 by the actuator 220. That is, in the magnetic recording system, the read head or write head formed on the head slider 230 approaches a desired position on the magnetic recording medium 200 and moves relatively, and a signal is read/written in order. The recording signal is recorded in the magnetic recording medium 200 at the read head through the signal processing system 240; the magnetic signal recorded in the magnetic recording medium 200 is electromagnetically exchanged by the read head, and then the electric signal is obtained through the signal processing system 240. In order to transfer the head slider 230 onto a desired recording track of the magnetic recording medium 200, the positional signal on the track is detected by the read head and positioning is carried out by controlling the actuator 220. Assuming that the magnetic signal is recorded on both sides of the magnetic recording medium 200, the figure shows the case where two head sliders 230 are mounted, but, of course, the magnetic signal may be recorded on only one side of the magnetic recording medium 200. In this case, one head slider 230 is mounted. Moreover, although only one magnetic recording medium 200 is shown, there may be a plurality of magnetic recording media 200.

In the aforementioned magnetic head according to embodiments of the present invention and a magnetic recording system wherein mounted, reading characteristics with high sensitivity and reliability can be obtained.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A magnetic head comprising a magnetoresistive film laminated with a pinned layer and a free layer through a nonmagnetic conductive layer or a tunneling barrier layer and with a pair of electrodes for letting current flow in a film-thickness direction of said magnetoresistive film, wherein:

said pinned layer has at least two magnetic layers laminated through an antiferromagnetic coupling layer, a nonmagnetic separate layer, a longitudinal biasing layer, and an antiferromagnetic layer are laminated, in order, on an opposite side of said free layer than said nonmagnetic conductive layer or tunneling baffler layer, and said longitudinal biasing layer applies a longitudinal biasing field to said free layer;

wherein the nonmagnetic separate layer has a thickness of about 0.35 nm.

2. The magnetic head as in claim 1, wherein the neighboring magnetic layers provided in said pinned layer are coupled antiferromagnetically to each other through the antiferromagnetic coupling layer, and a magnetization direction is substantially pinned without laminating of an antiferromagnetic layer on an opposite side of said nonmagnetic conductive layer or tunneling barrier layer than said pinned layer.

3. The magnetic head as in claim 1, wherein the magnetization direction of said longitudinal biasing layer and the magnetization direction of said pinned layer are substantially orthogonal.

4. The magnetic head as in claim 1, wherein said free layer and said longitudinal biasing layer are antiferromagnetically coupled through said nonmagnetic separate layer.

5. The magnetic head as in claim 1, further comprising a lower shield placed on a lower side of said magnetoresistive film and an upper shield placed on an upper side of said magnetoresistive film, wherein a gap between said lower and upper shields along a side of said magnetoresistive film is smaller than a thickness of said magnetoresistive film.

6. The magnetic head as in claim 1, wherein edges of said antiferromagnetic layer, said longitudinal biasing layer, said nonmagnetic separate layer, and said free layer are exposed to an air bearing surface; and said nonmagnetic conductive layer or tunneling barrier layer, and said pinned layer are not exposed to the air bearing surface.

7. The magnetic head as in claim 1, wherein said antiferromagnetic layer includes a material expressed by $Mn-M_1$ (where $M_1$ is one or more elements selected from Ni, Ru, Rh, Pd, Re, Os, Ir, and Pt), and a Mn content is in a range of about 45~55 at %.

8. The magnetic head as in claim 7, wherein the antiferromagnetic layer includes Ru as the $M_1$ material.

9. The magnetic head as in claim 1, wherein at least one of a plurality of magnetic layers constituting said pinned layer is made of a hard magnetic material, and a substantial magnetic moment of said pinned layer is almost zero when magnetization of said plurality of magnetic layers takes on an antiparallel magnetic configuration.

10. The magnetic head as in claim 1, wherein thicknesses of the magnetic layers of the pinned layer are controlled to make the magnetic moment almost zero when the magnetization of each of the magnetic layers is aligned antiparallel.

* * * * *

UNITED STATES PATENT AND TRADEMARK OFFICE
CERTIFICATE OF CORRECTION

PATENT NO. : 7,535,683 B2 Page 1 of 1
APPLICATION NO. : 10/977324
DATED : May 19, 2009
INVENTOR(S) : Kenichi Meguro et al.

It is certified that error appears in the above-identified patent and that said Letters Patent is hereby corrected as shown below:

In the Title:
Title Page, (54), please delete "Magnetoresistive Head With Improved In-Stack Longitudinal Biasing Layers" and insert -- Magnetoresistive Head With Improved In-Stack Longitudinal Biasing Layers And Fabricating Method --

In the Claims:
Claim 1, column 20, line 28, please delete "baffler" and insert -- barrier --

Signed and Sealed this

Fourteenth Day of July, 2009

JOHN DOLL
*Acting Director of the United States Patent and Trademark Office*

UNITED STATES PATENT AND TRADEMARK OFFICE
CERTIFICATE OF CORRECTION

PATENT NO. : 7,535,683 B2
APPLICATION NO. : 10/977324
DATED : May 19, 2009
INVENTOR(S) : Kenichi Meguro et al.

It is certified that error appears in the above-identified patent and that said Letters Patent is hereby corrected as shown below:

In the Title:
Title Page, (54) and Column 1, lines 1-3, please delete "Magnetoresistive Head With Improved In-Stack Longitudinal Biasing Layers" and insert -- Magnetoresistive Head With Improved In-Stack Longitudinal Biasing Layers And Fabricating Method --

In the Claims:
Claim 1, column 20, line 28, please delete "baffler" and insert -- barrier --

This certificate supersedes the Certificate of Correction issued July 14, 2009.

Signed and Sealed this

Eighteenth Day of August, 2009

David J. Kappos
*Director of the United States Patent and Trademark Office*